United States Patent
Lin et al.

(10) Patent No.: US 11,189,037 B2
(45) Date of Patent: Nov. 30, 2021

(54) REPOSITIONING METHOD AND APPARATUS IN CAMERA POSE TRACKING PROCESS, DEVICE, AND STORAGE MEDIUM

(71) Applicant: Tencent Technology (Shenzhen) Company Limited, Shenzhen (CN)

(72) Inventors: Xiangkai Lin, Shenzhen (CN); Yonggen Ling, Shenzhen (CN); Linchao Bao, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/900,634

(22) Filed: Jun. 12, 2020

(65) Prior Publication Data
US 2020/0302615 A1   Sep. 24, 2020

Related U.S. Application Data

(63) Continuation of application No. PCT/CN2019/079355, filed on Mar. 22, 2019.

(30) Foreign Application Priority Data

Apr. 27, 2018   (CN) .......................... 201810392368.5

(51) Int. Cl.
*G06T 7/70* (2017.01)
*G06T 7/80* (2017.01)
(Continued)

(52) U.S. Cl.
CPC ............ *G06T 7/20* (2013.01); *G06F 16/2255* (2019.01); *G06F 16/51* (2019.01); *G06K 9/6215* (2013.01);
(Continued)

(58) Field of Classification Search
CPC ................................... G06T 7/70; G06T 7/80
See application file for complete search history.

(56) References Cited

U.S. PATENT DOCUMENTS

2004/0201756 A1\* 10/2004 VanBree ................ H04N 5/222
348/239
2010/0259610 A1\* 10/2010 Petersen ............ G06K 9/00342
348/142
(Continued)

FOREIGN PATENT DOCUMENTS

CN          101996217 A       3/2011
CN          105808709 A       7/2016
(Continued)

OTHER PUBLICATIONS

Gionis, Aristides et al., "Similarity Search in High Dimensions via Hashing," VLDB "99: Proceedings of the 25th International Conference on Very Large Data Bases, Sep. 30, 1999, pp. 518-529.
(Continued)

*Primary Examiner* — Yi Yang
(74) *Attorney, Agent, or Firm* — Morgan, Lewis & Bockius LLP

(57) ABSTRACT

This application discloses a repositioning method performed by an electronic device in a camera pose tracking process, belonging to the field of augmented reality (AR). The method includes: obtaining a current image acquired by the camera after an $i^{th}$ anchor image in a plurality of anchor images; selecting a target keyframe from a keyframe database according to Hash index information in a case that the current image satisfies a repositioning condition; performing second repositioning on the current image relative to the target keyframe; and calculating a camera pose parameter of a camera during acquisition of the current image according to a positioning result of the first repositioning and a positioning result of the second repositioning. In a case that
(Continued)

there are different keyframes covering a surrounding area of a camera acquisition scene, it is highly probable that repositioning can succeed, thereby improving the success probability of a repositioning process.

20 Claims, 9 Drawing Sheets

(51) Int. Cl.
| | |
|---|---|
| G06T 7/20 | (2017.01) |
| G06F 16/22 | (2019.01) |
| G06F 16/51 | (2019.01) |
| G06K 9/62 | (2006.01) |
| G06T 19/00 | (2011.01) |
| G06T 19/20 | (2011.01) |

(52) U.S. Cl.
CPC .............. *G06T 7/70* (2017.01); *G06T 19/006* (2013.01); *G06T 19/20* (2013.01); *G06T 2207/10016* (2013.01); *G06T 2207/30244* (2013.01); *G06T 2219/2004* (2013.01)

(56) References Cited

U.S. PATENT DOCUMENTS

| | | | |
|---|---|---|---|
| 2012/0159368 A1* | 6/2012 | Negrillo | G06Q 30/00 715/771 |
| 2012/0221572 A1* | 8/2012 | Wang | G06F 16/5838 707/737 |
| 2018/0012105 A1* | 1/2018 | Fan | G06K 9/00664 |
| 2020/0300637 A1* | 9/2020 | Chiu | G05D 1/0253 |

FOREIGN PATENT DOCUMENTS

| | | |
|---|---|---|
| CN | 106780601 A | 5/2017 |
| CN | 106885574 A | 6/2017 |
| CN | 106934827 A | 7/2017 |
| CN | 107301402 A | 7/2017 |
| CN | 107193279 A | 9/2017 |
| CN | 107209853 A | 9/2017 |
| KR | 20120038616 A | 4/2012 |
| WO | WO 2017172778 A1 | 10/2017 |

OTHER PUBLICATIONS

Tencent Technology, ISR, PCT/CN2019/079355, dated Jul. 1, 2019, 2 pgs.
Tencent Technology, WO, PCT/CN2019/079355, dated Jul. 1, 2019, 4 pgs.
Tencent Technology, IPRP, PCT/CN2019/079355, dated Oct. 27, 2020, 5 pgs.

* cited by examiner

REPOSITIONING METHOD AND APPARATUS IN CAMERA POSE TRACKING PROCESS, DEVICE, AND STORAGE MEDIUM

CROSS REFERENCE TO RELATED APPLICATIONS

This application is a continuation application of PCT Patent Application No. PCT/CN2019/079355, entitled "METHOD, DEVICE AND APPARATUS FOR REPOSITIONING IN CAMERA ORIENTATION TRACKING PROCESS, AND STORAGE MEDIUM" filed on Mar. 22, 2019, which claims priority to Chinese Patent Application No. 201810392368.5, entitled "REPOSITIONING METHOD AND APPARATUS IN CAMERA POSE TRACKING PROCESS, DEVICE, AND STORAGE MEDIUM" filed Apr. 27, 2018, all of which are incorporated by reference in their entirety.

This application is related to U.S. application Ser. No. 16/915,798, entitled "REPOSITIONING METHOD AND APPARATUS IN CAMERA POSE TRACKING PROCESS AND STORAGE MEDIUM" filed on Jun. 29, 2020 which is incorporated by reference in its entirety.

FIELD OF THE TECHNOLOGY

Embodiments of this application relate to the field of augmented reality (AR), and in particular, to a repositioning method and apparatus in a camera pose tracking process, a device, and a storage medium.

BACKGROUND OF THE DISCLOSURE

Visual simultaneous localization and mapping (SLAM) is a technology in which a subject equipped with a camera establishes a model of an environment during movement without a priori information of the environment and at the same time estimates the movement thereof. The SLAM is applicable to the field of AR, the field of robots, and the field of autopilot.

Monocular vision SLAM is used as an example. The first frame of image acquired by a camera is usually used as an anchor image. In a case that the camera subsequently acquires a current image, a device tracks a common feature point between the current image and the anchor image, and performs calculation according to a position change of the feature point between the current image and the anchor image to obtain a pose change of the camera in the real world. However, in some scenarios, a feature point in the current image may be lost and can no longer be tracked. In this case, an SLAM repositioning method needs to be used to perform repositioning in the current image.

SUMMARY

Embodiments of this application provide a repositioning method and apparatus in a camera pose tracking process, a device, and a storage medium, so that a problem that the effect of directly using an SLAM repositioning method in the related art in an AR use scenario is relatively poor can be resolved. The technical solutions are as follows:

According to an aspect of this application, a repositioning method in a camera pose tracking process is provided, applied to an electronic device having a camera, the device being configured to sequentially perform camera pose tracking on a plurality of anchor images, the method including:

obtaining a current image acquired by the camera after an $i^{th}$ anchor image in the plurality of anchor images, i being an integer greater than 1;

obtaining an initial feature point and an initial pose parameter in the first anchor image in the plurality of anchor images in a case that the current image satisfies a repositioning condition, the initial pose parameter being used to indicate a camera pose of the camera during acquisition of the first anchor image;

performing feature point tracking on the current image relative to the first anchor image, to obtain a target feature point matching the initial feature point;

calculating a pose change amount of a change of the camera from a first camera pose to a target camera pose according to the initial feature point and the target feature point, the target camera pose being a camera pose of the camera during acquisition of the current image; and performing repositioning according to the initial pose parameter and the pose change amount to obtain a target pose parameter corresponding to the target camera pose.

According to another aspect of this application, a repositioning apparatus in a camera pose tracking process is provided, applied to an electronic device having a camera, the apparatus being configured to sequentially perform camera pose tracking on a plurality of anchor images, and the apparatus including:

an image obtaining module, configured to obtain a current image acquired by the camera after an $i^{th}$ anchor image in the plurality of anchor images, i being an integer greater than 1;

an information obtaining module, configured to obtain an initial feature point and an initial pose parameter in the first anchor image in the plurality of anchor images in a case that the current image satisfies a repositioning condition, the initial pose parameter being used to indicate a camera pose of the camera during acquisition of the first anchor image;

a feature point tracking module, configured to perform feature point tracking on the current image relative to the first anchor image, to obtain a target feature point matching the initial feature point;

a change amount calculation module, configured to calculate a pose change amount of a change of the camera from a first camera pose to a target camera pose according to the initial feature point and the target feature point, the target camera pose being a camera pose of the camera during acquisition of the current image; and a repositioning module, configured to perform repositioning according to the initial pose parameter and the pose change amount to obtain a target pose parameter corresponding to the target camera pose.

According to another aspect of the embodiments of this application, an electronic device is provided, the electronic device including a memory and a processor, the memory storing at least one instruction, the at least one instruction being loaded and executed by the processor to implement the foregoing repositioning method.

According to another aspect of the embodiments of this application, a non-transitory computer-readable storage medium is provided, the storage medium storing at least one instruction, the at least one instruction being loaded and executed by a processor to implement the foregoing repositioning method.

The beneficial effects produced by the technical solutions provided in the embodiments of this application at least includes:

In a case that a current image satisfies a repositioning condition, repositioning is performed on the current image and a keyframe in a keyframe database, so that repositioning can be implemented in an anchor-SLAM algorithm for tracking a plurality of consecutive anchor images, and a tracking process is less prone to interruption. Because there may be a plurality of keyframes in the keyframe database, in a case that the keyframe database includes different keyframes covering a surrounding area of a camera acquisition scene, it is highly probable that repositioning can succeed, thereby improving the success probability of a repositioning process.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Several nouns used in this application are briefly described first:

AR is a technology that as a camera acquires an image, a camera pose parameter of the camera in the real world (or referred to as the three-dimensional world or the actual world) is calculated in real time, and a virtual element is added according to the camera pose parameter to the image acquired by the camera. The virtual element includes, but is not limited to, an image, a video, and a three-dimensional model. The objective of the AR technology is to overlay the virtual world on a screen onto the real world to perform interaction. The camera pose parameter includes a displacement vector and a rotation matrix. The displacement vector is used to represent a displacement distance of the camera in the real world. The rotation matrix is used to represent a rotation angle of the camera in the real world.

Figure 1:
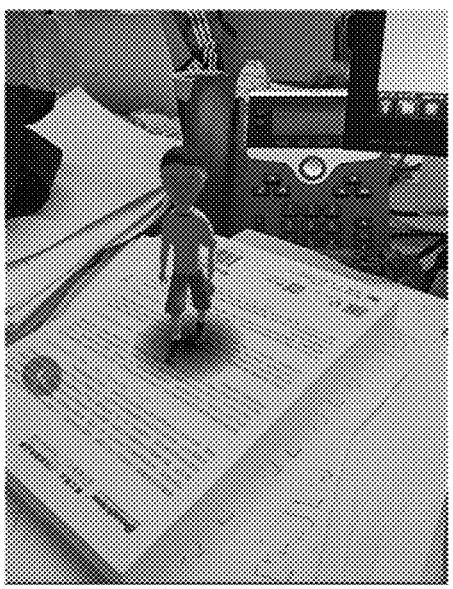
FIG. 1 is a schematic scenario diagram of an AR application scenario according to an exemplary embodiment of this application.
Figure 2:
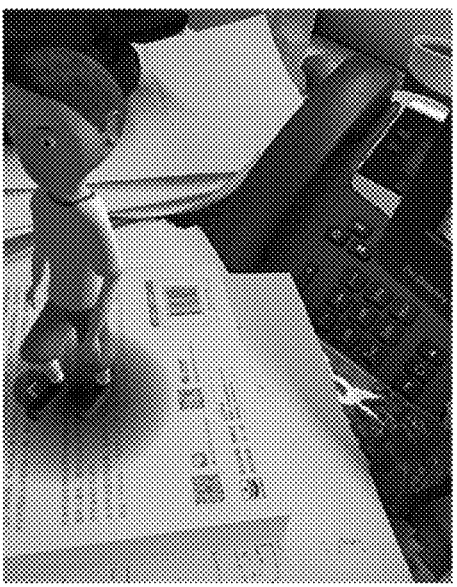
FIG. 2 is a schematic scenario diagram of an AR application scenario according to an exemplary embodiment of this application.

For example, referring to FIG. 1 and FIG. 2, a device adds a figure of a virtual human to an image photographed by the camera. As the camera moves in the real world, the image photographed by the camera changes, and a photographing position of the virtual human also changes, thereby simulating an effect that the virtual human is still in the image and the camera photographs the image and the virtual human while the position and pose are changing, so as to present a realistic three-dimensional picture to a user.

An anchor-switching AR system is an AR system that determines a camera pose parameter in a natural scene based on camera pose tracking of a plurality of anchor images and overlays the virtual world according to the camera pose parameter onto an image acquired by the camera.

An inertial measurement unit (IMU) is an apparatus configured to measure tri-axial attitude angles (or angular velocities) and accelerations of an object. Generally, the IMU includes three uniaxial accelerometers and three uniaxial gyroscopes. The accelerometer is configured to detect an acceleration signal of an object on each coordinate axis of a three-dimensional coordinate system, to calculate the displacement vector. The gyroscopes are configured to detect a rotation matrix of the object in the three-dimensional coordinate system. Optionally, the IMU includes a gyroscope, an accelerometer, and a geomagnetic sensor.

Schematically, a manner of establishing a three-dimensional coordinate system is as follows: 1. The X axis is defined by a vector product Y*Z, and a direction tangential to the ground at a current position of the device on the X axis points to the east. 2. A direction tangential to the ground at the current position of the device on the Y axis points to the north pole of the geomagnetic field. 3. The Z axis points to the sky and is perpendicular to the ground.

During camera pose tracking in the field of AR, for example, in a scenario of using a mobile phone to photograph a desktop to play an AR game, due to a special use scenario of AR, a fixed plane (for example, a desktop or a wall surface) in the real world is usually continuously photographed, the effect of directly using an SLAM repositioning method in the related art is relatively poor, and it is still necessary to provide a repositioning solution applicable to the field of AR.

Figure 3:
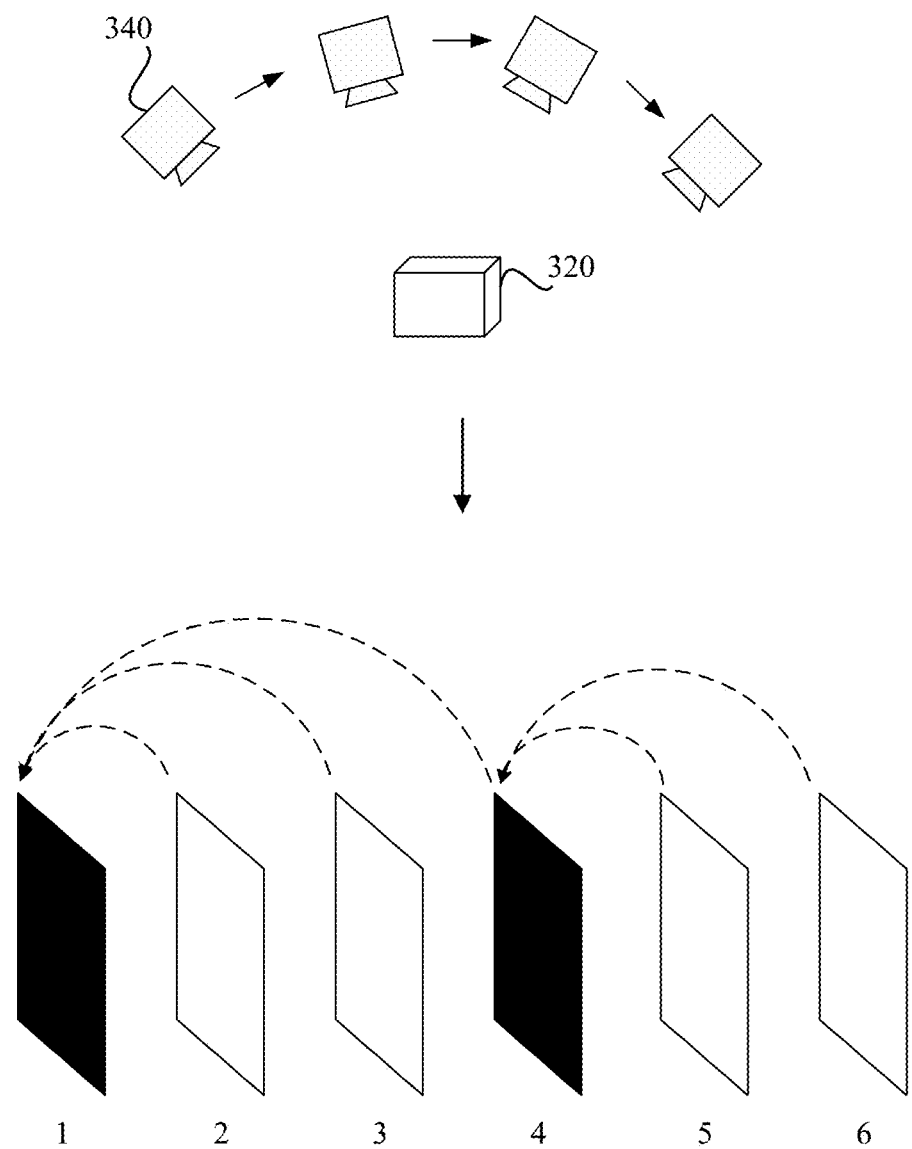
FIG. 3 is a schematic diagram of the principle of an anchor-switching AR system algorithm according to an exemplary embodiment of this application.

This application provides a repositioning method applicable to an anchor-switching AR system algorithm. In the anchor-switching AR system algorithm, in a process of determining a camera pose, a movement process of a camera is divided into at least two tracking processes to perform tracking, and each tracking process corresponds to a respective anchor image. Schematically, in a tracking process corresponding to an $i^{th}$ anchor image, in a case that a tracking effect of a current image relative to the $i^{th}$ anchor image is poorer than a preset condition (for example, a quantity of feature points that can be obtained through matching is less than a preset threshold), a previous image of the current image is determined as an $(i+1)^{th}$ anchor image, and an $(i+1)^{th}$ tracking process is started, i being a positive integer. Schematically, FIG. 3 is a schematic diagram of the principle of the anchor-switching AR system algorithm according to an exemplary embodiment of this application. An object 320 exists in the real world, a device 340 provided with a camera is held by a user to move, and a plurality of frames of image 1 to 6 including the object 320 are photographed during movement. The device determines the image 1 as the first anchor image (born-anchor or born-image) and records an initial pose parameter. The initial pose parameter may be acquired by an IMU. Feature point tracking is then performed on the image 2 relative to the image 1, and a pose parameter of the camera during the photographing of the image 2 is calculated according to the initial pose parameter and a feature point tracking result. Feature point tracking is performed on the image 3 relative to the image 1, and a pose parameter of the camera during the photographing of the image 3 is calculated according to the initial pose parameter and a feature point tracking result. Feature point tracking is performed on the image 4 relative to the image 1, and a pose parameter of the camera during the photographing of the image 4 is calculated according to the initial pose parameter and a feature point tracking result.

Feature point tracking is then performed on the image 5 relative to the image 1. The image 4 is determined as the second anchor image in a case that the effect of feature point tracking is poorer than a preset condition (for example, there is a relatively small quantity of matching feature points). Feature point tracking is performed on the image 5 relative to the image 4, and a displacement change amount of the camera during the photographing of the image 4 and the photographing of the image 5 is calculated. A displacement change amount of the camera between the photographing of the image 4 and the photographing of the image 1 and the initial pose parameter are then combined to calculate a pose parameter of the camera during the photographing of the image 5. Feature point tracking is then performed on the image 6 relative to the image 4. The rest is deduced by analogy. A previous frame of image of the current image may be determined as a new anchor image in a case that the effect of feature point tracking of the current image deteriorates, and feature point tracking is performed again after switching to the new anchor image.

Optionally, an algorithm based on a visual odometry principle such as a feature point method or a direct method may be used for feature point tracking. However, in various abnormal scenarios such as that the camera moves relatively intensely, moves toward an intense light source, and moves toward a white wall in a tracking process, a loss phenomenon may occur in the foregoing tracking process of an anchor-switching AR system. The loss phenomenon means that sufficient feature points cannot be obtained from a current image through matching, resulting in a tracking failure.

Figure 4:
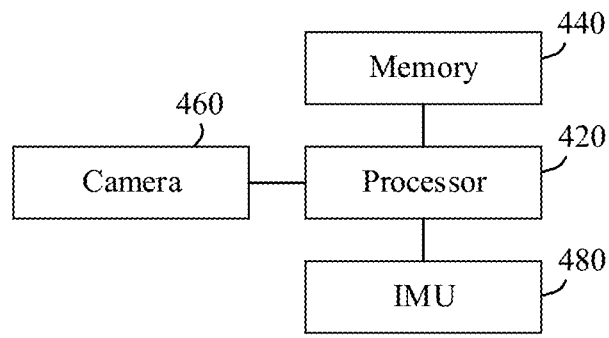
FIG. 4 is a structural block diagram of an electronic device according to an exemplary embodiment of this application.

FIG. 4 is a structural block diagram of an electronic device according to an exemplary embodiment of this application. The device includes a processor 420, a memory 440, a camera 460, and an IMU 480.

The processor 420 includes one or more processing cores, for example, a 4-core processor, an 8-core processor, and the like. The processor 420 is configured to execute at least one of an instruction, a code, a code segment, and a program stored in the memory 440.

The processor 420 is electrically connected to the memory 440. Optionally, the processor 420 is connected to the memory 440 by a bus. The memory 440 stores one or more instructions, codes, code segments and/or programs. The instruction, code, code segment and/or program is executed by the processor 420 to implement an SLAM repositioning method provided in the following embodiments.

The processor 420 is further electrically connected to the camera 460. Optionally, the processor 420 is connected to the camera 460 by a bus. The camera 460 is a sensing device having an image acquisition capability. The camera 460 may also be referred to as a photosensitive device, among other names. The camera 460 has a capability of consecutively acquiring images or repeatedly acquiring images. Optionally, the camera 460 is disposed inside or outside the device.

The processor 420 is further electrically connected to the IMU 480. Optionally, the IMU 480 is configured to: acquire a pose parameter of the camera at an interval of a predetermined time, and record a time stamp of each group of pose parameters during acquisition. The pose parameter of the camera includes a displacement vector and a rotation matrix. The rotation matrix acquired by the IMU 480 is relatively accurate, and the acquired displacement vector may have a relatively large error due to an actual environment.

Figure 5:
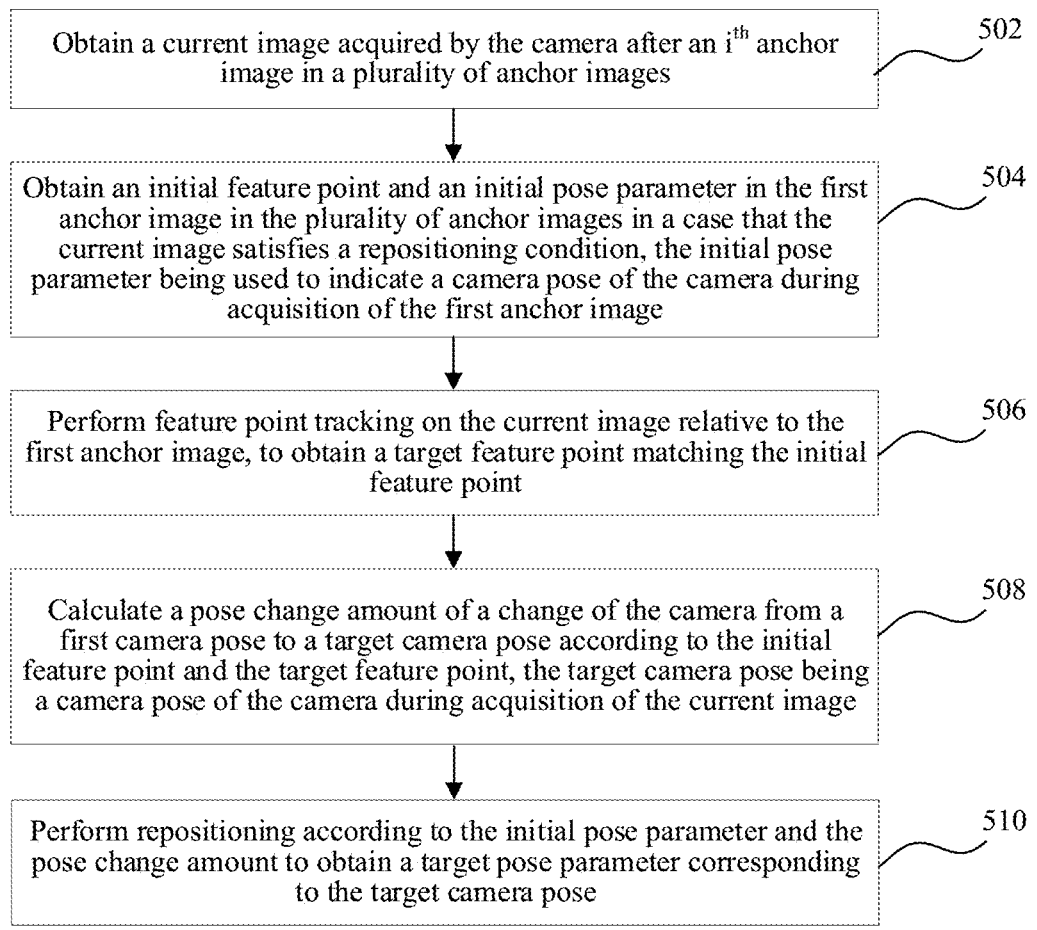
FIG. 5 is a flowchart of a repositioning method in a camera pose tracking process according to an exemplary embodiment of this application.

FIG. 5 is a flowchart of a repositioning method in a camera pose tracking process according to an exemplary embodiment of this application. This embodiment is described by using an example in which the repositioning method is applied to the device shown in FIG. 4. The device is configured to sequentially perform camera pose tracking on a plurality of anchor images. The method includes the following steps:

Step 502: Obtain a current image acquired by the camera after an $i^{th}$ anchor image in the plurality of anchor images.

A camera in the device acquires frames of image at an interval of a preset time to form an image sequence. Optionally, the camera acquires frames of image at an interval of a preset time in a movement (translation and/or rotation) process to form an image sequence.

Optionally, the device determines the first frame of image in the image sequence (or one frame of image satisfying a predetermined condition in several frames of image in the front) as the first anchor image, performs feature point tracking on a subsequently acquired image relative to the first anchor image, and calculates a camera pose parameter of the camera according to a feature point tracking result. In a case that the effect of feature point tracking of a current frame of image is poorer than a preset condition, a previous frame of image of the current frame of image is determined as the second anchor image, feature point tracking is performed on a subsequently acquired image relative to the second anchor image, and the camera pose parameter of the camera is calculated according to a feature point tracking result. The rest is deduced by analogy. The device may sequentially perform camera pose tracking on a plurality of consecutive anchor images.

During an $i^{th}$ tracking process corresponding to the $i^{th}$ anchor image, the camera acquires a current image. The current image is a frame of image acquired after the $i^{th}$ anchor image, i being an integer greater than 1.

Step 504: Obtain an initial feature point and an initial pose parameter in the first anchor image in the plurality of anchor images in a case that the current image satisfies a repositioning condition, the initial pose parameter being used to indicate a camera pose of the camera during acquisition of the first anchor image.

The device determines whether the current image satisfies the repositioning condition. The repositioning condition is used to indicate that a tracking process of the current image relative to the $i^{th}$ anchor image fails, or, the repositioning condition is used to indicate that an accumulated error in historical tracking processes is already greater than the preset condition.

In an optional embodiment, the device tracks the current image relative to the $i^{th}$ anchor image, and determines that a tracking process of the current image relative to the $i^{th}$ anchor image fails, and the current image satisfies the repositioning condition in a case that a feature point matching the $i^{th}$ anchor image does not exist in the current image or a quantity of feature points in the current image that match the $i^{th}$ anchor image is less than a first quantity.

In another optional embodiment, the device determines that an accumulated error in historical tracking processes is already greater than the preset condition in a case that the device determines that a quantity of frames between the current image and an image in previous repositioning is greater than a second quantity, or the device determines that an accumulated error in historical tracking processes is already greater than the preset condition in a case that the device determines that a quantity of anchor images between the $i^{th}$ anchor image and the first anchor image is greater than a third quantity.

Specific condition content of the repositioning condition is not limited in this embodiment.

The device attempts to perform feature point tracking on the current image relative to the first anchor image in a case that the current image satisfies the repositioning condition. In this case, the device obtains a cached initial feature point and initial pose parameter in the first anchor image, and the initial pose parameter is used to indicate the camera pose of the camera during acquisition of the first anchor image.

Step 506: Perform feature point tracking on the current image relative to the first anchor image, to obtain a target feature point matching the initial feature point.

Optionally, each matching feature point pair includes one initial feature point and one target feature point that match each other.

A tracking algorithm based on visual odometry may be used for feature point tracking. This is not limited in this application. In an embodiment, a Kanade-Lucas (KLT) optical flow tracking algorithm is used for feature point tracking. In another embodiment, for feature point tracking, use a SIFT feature point descriptor extracted based on a scale-invariant feature transform (SIFT) algorithm and an ORB feature point descriptor extracted based on an oriented FAST and rotated BRIEF (ORB, fast feature point extraction and description) algorithm are used to perform feature point tracking. In this application, a specific algorithm for feature point tracking is not limited, and a feature point method or a direct method may be used for a feature point tracking process.

In an embodiment, the device performs feature point extraction on the first anchor image, to obtain N initial feature points. The device further performs feature point extraction on the current image, to obtain M candidate feature points. The device then matches the M candidate feature points one by one against the N initial feature points, to determine at least one matching feature point pair. Each matching feature point pair includes an initial feature point and a target feature point. The initial feature point is a feature point in the first anchor image, and the target feature point is a candidate feature point that is in the current image and has the highest matching degree with an $i^{th}$ initial feature point.

Optionally, a quantity of initial feature points is greater than or equal to a quantity of target feature points. For example, there are 450 initial feature points, and there are 320 target feature points.

Step 508: Calculate a pose change amount of a change of the camera from the initial pose parameter to a target pose parameter according to the initial feature point and the target feature point, the target pose parameter being used to represent a camera pose of the camera during acquisition of the current image.

Optionally, the device calculates a homography matrix between two frames of image according to the initial feature point and the target feature point; and decomposes the homography matrix to obtain the pose change amount including $R_{relocalize}$ and $T_{relocalize}$ of the change of the camera from the initial pose parameter to the target pose parameter.

The homography matrix describes a mapping relationship between two planes. The homography matrix may be used to perform movement estimation in a case that feature points in the natural scenario (the real environment) all fall in a same physical plane. The device uses RANdom SAmple Consensus (RANSAC) to decompose the homography matrix in a case that there are at least four pairs of matching initial feature points and target feature points, to obtain a rotation matrix $R_{relocalize}$ and a translation vector $T_{relocalize}$.

$R_{relocalize}$ is the rotation matrix of the change of the camera from the initial pose parameter to the target pose parameter, and $T_{relocalize}$ is a displacement vector of the change of the camera from the initial pose parameter to the target pose parameter.

Step 510: Perform repositioning according to the initial pose parameter and the pose change amount to obtain the target pose parameter.

After performing conversion on the initial pose parameter by using the pose change amount, the device performs repositioning to obtain the target pose parameter, so as to calculate the camera pose of the camera during acquisition of the current image.

In conclusion, by means of the repositioning method provided in this embodiment, repositioning is performed on a current image and the first anchor image in a case that the current image satisfies a repositioning condition, so that repositioning can be implemented in an anchor-switching AR system algorithm for tracking a plurality of consecutive anchor images, and a tracking process is less prone to interruption, thereby resolving a problem that an SLAM repositioning method in the related art and is not applicable to a mutated SLAM algorithm.

In addition, because repositioning is performed on the current image relative to the first anchor image in a repositioning process, it may be considered that the first anchor image has no accumulated error. Therefore, in this embodiment, an accumulated error generated in a tracking process of a plurality of anchor images can further be eliminated.

Figure 6:
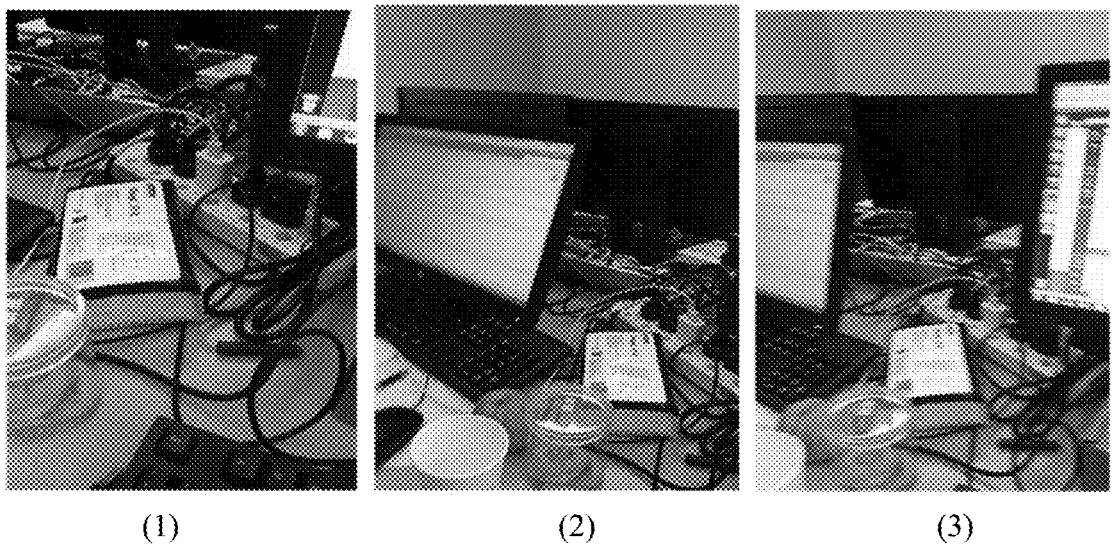
FIG. 6 is a schematic diagram of comparison among the first anchor image, a current image, and a first-order keyframe according to an exemplary embodiment of this application.

In the repositioning method shown in FIG. 5, repositioning is performed on a current image relative to the first anchor image. In the method, repositioning may fail in some scenarios. For example, in a case that a photographing pose corresponding to the current image is greatly different from a photographing pose of the first anchor image, repositioning implemented by directly establishing a match between the current image and the first anchor image may fail. Schematically, it is set that the picture (1) in FIG. 6 is the first anchor image, and the picture (2) in FIG. 6 is the current image. Because there is an excessively small overlapping area between the current image and the first anchor image, and a sufficient matching degree is not reached, repositioning directly performed on the current image and the first anchor image fails. In an embodiment of this application, the picture (3) in FIG. 6 is introduced as a first-order keyframe, a rotation matrix and a translation vector are respectively calculated for a matching result of the current image relative to the first-order keyframe and a matching result (repositioning result) of the first-order keyframe relative to the first anchor image, and the two matching results are associated in a manner of switching an anchor image (using the first-order keyframe as an anchor image), to obtain the rotation matrix and a translation vector of the current image relative to the first anchor image, so that repositioning succeeds.

Figure 7:
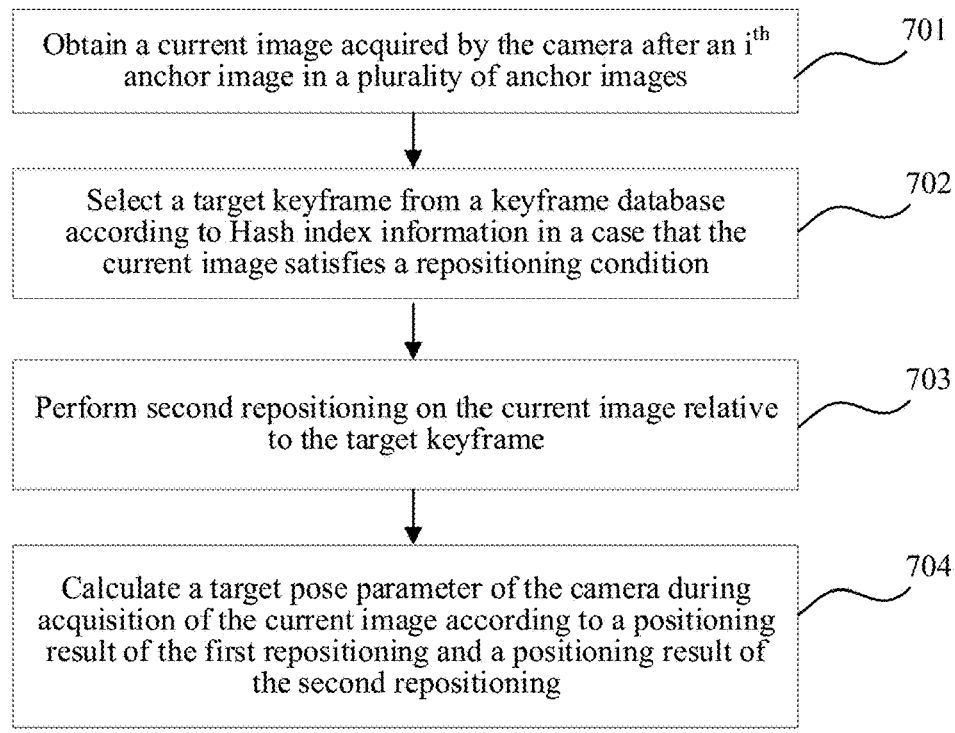
FIG. 7 is a flowchart of a repositioning method in a camera pose tracking process according to an exemplary embodiment of this application.

FIG. 7 is a flowchart of a repositioning method in a camera pose tracking process according to another exemplary embodiment of this application. This embodiment is described by using an example in which the repositioning method is applied to the device shown in FIG. 4. The device is configured to sequentially perform camera pose tracking on a plurality of anchor images. The method includes the following steps:

Step 701: Obtain a current image acquired by the camera after an $i^{th}$ anchor image in the plurality of anchor images, i being greater than 1.

A camera in the device acquires frames of image at an interval of a preset time to form an image sequence. Optionally, the camera acquires frames of image at an interval of a preset time in a movement (translation and/or rotation) process to form an image sequence.

Optionally, the device determines the first frame of image in the image sequence (or one frame of image satisfying a predetermined condition in several frames of image in the front) as the first anchor image, performs feature point tracking on a subsequently acquired image relative to the first anchor image, and calculates a camera pose parameter of the camera according to a feature point tracking result. In a case that the effect of feature point tracking of a current frame of image is poorer than a preset condition, a previous frame of image of the current frame of image is determined as the second anchor image, feature point tracking is performed on a subsequently acquired image relative to the second anchor image, and the camera pose parameter of the camera is calculated according to a feature point tracking result. The rest is deduced by analogy. The device may sequentially perform camera pose tracking on a plurality of consecutive anchor images.

During an $i^{th}$ tracking process corresponding to the $i^{th}$ anchor image, the camera acquires a current image. The current image is a frame of image acquired after the $i^{th}$ anchor image, i being an integer greater than 1.

Step 702. Select a target keyframe from a keyframe database according to Hash index information in a case that the current image satisfies a repositioning condition, the keyframe database storing Hash index information of at least one keyframe, and the keyframe being an image that is cached in a camera pose tracking process and has successful first repositioning relative to another image.

There may be more than one repositioning process in the camera pose tracking process. The device chooses some representative images from images with successful repositioning as keyframes and saves the keyframes in the keyframe database. The keyframe database is a database configured to store related information of a keyframe. Optionally, the related information includes Hash index information of the keyframe and a first repositioning result corresponding to the keyframe. Optionally, the related information further includes the image of the keyframe.

The device determines whether the current image satisfies the repositioning condition. The repositioning condition is used to indicate that a tracking process of the current image relative to the $i^{th}$ anchor image fails, or, the repositioning condition is used to indicate that an accumulated error in historical tracking processes is already greater than the preset condition.

In an optional embodiment, the device tracks the current image relative to the $i^{th}$ anchor image, and determines that a tracking process of the current image relative to the $i^{th}$ anchor image fails, and the current image satisfies the repositioning condition in a case that a feature point matching the $i^{th}$ anchor image does not exist in the current image or a quantity of feature points in the current image that match the $i^{th}$ anchor image is less than a first quantity.

In another optional embodiment, the device determines that an accumulated error in historical tracking processes is already greater than the preset condition in a case that the device determines that a quantity of frames between the current image and an image in previous repositioning is greater than a second quantity, or the device determines that an accumulated error in historical tracking processes is already greater than the preset condition in a case that the device determines that a quantity of anchor images between the $i^{th}$ anchor image and the first anchor image is greater than a third quantity.

Specific condition content of the repositioning condition is not limited in this embodiment.

The device chooses a target keyframe from the keyframe database in a case that the current image satisfies the repositioning condition. Optionally, the target keyframe is an image at the smallest image distance from the current image (or the most approximate image or the most similar image of the current image) in the keyframe database.

In an embodiment of this application, the keyframe database stores the Hash index information of the keyframe, and the device chooses the target keyframe from the keyframe database according to the Hash index information.

Step 703: Perform second repositioning on the current image relative to the target keyframe.

After choosing the target keyframe from the keyframe database, the device performs repositioning on the current image relative to the target keyframe. Optionally, a process of repositioning includes the following steps:

1: Obtain a keyframe feature point of the target keyframe and a positioning result of the first repositioning.

The keyframe database stores a keyframe feature point on each keyframe and a tracking result of a first camera pose. Optionally, the keyframe feature point is represented by using a SIFT feature point descriptor or an ORB feature point descriptor. The positioning result of the first repositioning is a camera pose parameter of the camera during acquisition of a keyframe (referred to as a keyframe pose parameter for short), or, a first camera pose tracking result is a pose change amount including a rotation matrix and a displacement vector of the camera pose parameter of the camera during acquisition of the keyframe relative to a camera pose parameter of the camera during acquisition of the first anchor image.

2. Perform feature point tracking on the current image relative to a target keyframe database, to obtain a target feature point matching the keyframe feature point.

Optionally, each matching feature point pair includes one keyframe feature point and one target feature point that match each other.

A tracking algorithm based on visual odometry may be used for feature point tracking. This is not limited in this application. In an embodiment, a KLT optical flow tracking algorithm is used for feature point tracking. In another embodiment, for feature point tracking, an ORB feature point descriptor extracted based on an ORB (fast feature point extraction and description) algorithm is used to perform feature point tracking. In this application, a specific algorithm for feature point tracking is not limited, and a feature point method or a direct method may be used for a feature point tracking process. Another binary feature point descriptor may be used for the feature point. This is not limited in this application.

In an embodiment, because the target keyframe is an image with successful repositioning, the device performs feature point extraction on the target keyframe, to obtain N keyframe feature points. The device further performs feature point extraction on the current image, to obtain M candidate feature points. The device then matches the M candidate feature points one by one against N initial feature points, to determine at least one matching feature point pair. Each matching feature point pair includes a keyframe feature point and a target feature point. The keyframe feature point is a feature point on the target keyframe, and the target feature point is a candidate feature point having the highest matching degree with the keyframe feature point in the current image.

Optionally, a quantity of the keyframe feature points is greater than or equal to a quantity of target feature points. For example, there are 480 keyframe feature points, and there are 350 target feature points.

3. Calculate a pose change amount of a change of the camera from the keyframe pose parameter to a target pose parameter according to the keyframe feature point and the target feature point, the target pose parameter being used to represent a camera pose of the camera during acquisition of the current image.

Optionally, the device calculates a homography matrix between two frames of image according to the keyframe feature point and the target feature point; and decomposes the homography matrix to obtain the pose change amount including $R_{cm}$ and $T_{cm}$ of the change of the camera from the keyframe pose parameter to the target pose parameter.

$R_{cm}$ is a rotation matrix of the change of the camera from the keyframe pose parameter to the target pose parameter, and $T_{cm}$ is a displacement vector of the change of the camera from the keyframe pose parameter to the target pose parameter.

Step 704: Calculate a target pose parameter of the camera during acquisition of the current image according to a positioning result of the first repositioning and a positioning result of the second repositioning.

It is assumed that the positioning result of the first repositioning includes $R_{mf}$ and $T_{mf}$. $R_{mf}$ is a rotation matrix of the change of the camera from an initial pose parameter to a keyframe pose parameter, $T_{mf}$ is the displacement vector of the change of the camera from the initial pose parameter to the keyframe pose parameter, and the target pose parameter of the camera during acquisition of the current image is calculated by using the following formula:

$$\begin{bmatrix} R & T \\ 0 & 1 \end{bmatrix} = \begin{bmatrix} R_{cm} & S_{mf} * T_{cm} \\ 0 & \end{bmatrix} * \begin{bmatrix} R_{mf} & T_{mf} \\ 0 & 1 \end{bmatrix},$$

R and T being the target pose parameter, and $S_{mf}$ being a scale of a target keyframe.

In conclusion, by means of the repositioning method provided in this embodiment, in a case that a current image satisfies a repositioning condition, repositioning is performed on the current image and a keyframe in a keyframe database, repositioning can be implemented in an anchor-switching AR system algorithm for tracking a plurality of consecutive anchor images, and a tracking process is less prone to interruption. Because there may be a plurality of keyframes in the keyframe database, in a case that the keyframe database includes different keyframes covering a surrounding area of a camera acquisition scene, it is highly probable that repositioning can succeed, thereby improving the success probability of a repositioning process.

Keyframes are gradually added and deleted in the keyframe database. Keyframes are all images with successful repositioning. Optionally, the keyframe includes at least one of the following two images:

1. a first-order keyframe on which the first repositioning is successfully performed relative to the first anchor image in the plurality of anchor images; and 2. an nth-order keyframe on which the first repositioning is successfully performed relative to an $(n-1)^{th}$-order keyframe in the keyframe database, n being an integer greater than 1.

Hash Index Information

Hash index information is also referred to as a hash-bundle, a Hash index array, a Hash warehouse or the like. Because each keyframe has many feature point descriptors, for example, 100 to 500 feature point descriptors, each feature point descriptor may be a SIFT feature point descriptor or an ORB feature point descriptor. For example, the feature point descriptor is an ORB feature point descriptor. The ORB feature point descriptor is a 256-bit binary descriptor and has rotational invariance. The Hash index information including m columns*n rows of entry storage locations. First feature point descriptors on a plurality of keyframes are classified according to a Hash classification rule and stored in first entry storage locations corresponding to the m columns*n rows of entry storage locations.

Figure 8:
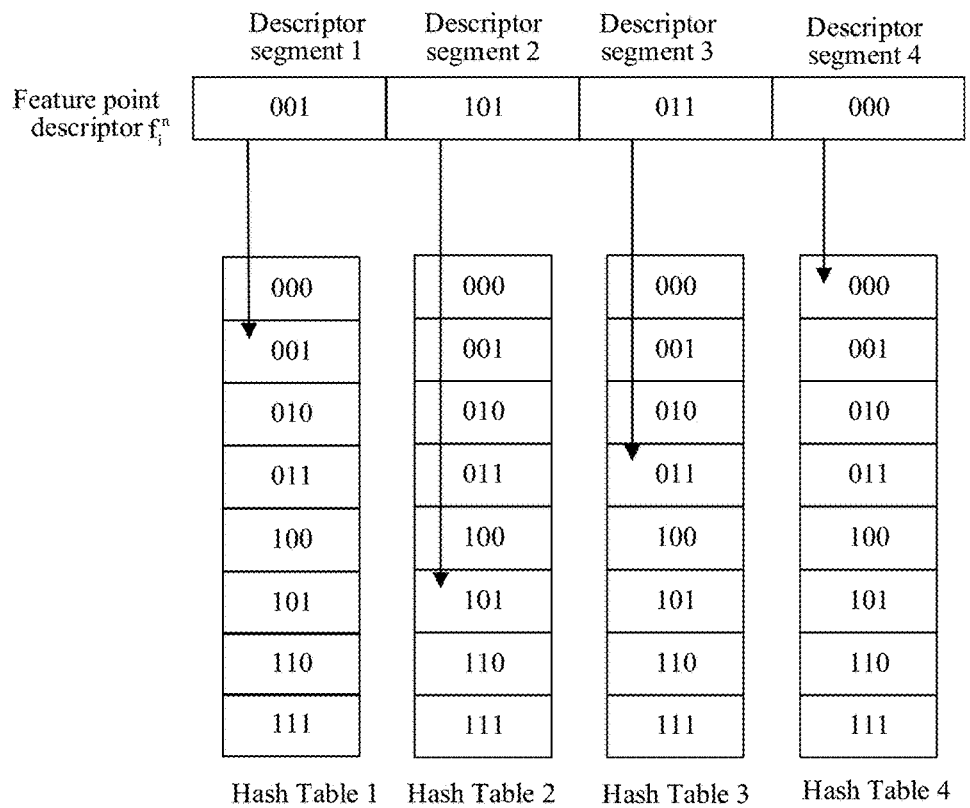
FIG. 8 is a schematic diagram of a data structure of Hash index information according to an exemplary embodiment of this application.

Referring to FIG. 8, for example, m=4, and n=8. The Hash index information including 4*8 entry storage locations. Each column entry storage location may be a Hash table, there are a total of four Hash tables: Hash Table 1, Hash Table 2, Hash Table 3, and Hash Table 4. Hash Table 1 has eight entry storage locations, Hash Table 2 has eight entry storage locations, Hash Table 3 has eight entry storage locations, and Hash Table 4 has eight entry storage locations. Each entry storage location has a respective entry identifier. For example, the entry identifiers of the eight entry storage locations in Hash Table 1 are sequentially: 000, 001, 010, 011, 100, 101, 110, and 111. Each entry storage location may be considered as a "drawer", and the entry identifier may be considered as a "drawer number". In every i Hash tables, the index information of the first feature point descriptor is allocated to one of the eight entry storage locations according to the Hash classification rule for storage. The entry identifier of the entry storage location matches a Hash value of an $i^{th}$ segment of the first feature point descriptor. Index information of a feature point descriptor includes the feature point descriptor and an identifier of the keyframe to which the feature point descriptor belongs. Optionally, the index information of the feature point descriptor further includes an order number of the keyframe to which the feature point descriptor, that is, a first-order keyframe, a second-order keyframe, a three-order keyframe or the like.

Schematically, it is assumed that an $i^{th}$ feature point descriptor $f_i^n$ in the keyframe n is: 001101011000. The feature point descriptor $f_i^n$ is equally divided into four descriptor segments: 001, 101, 011, and 000. Because a Hash value of a descriptor segment 1 is 001, index information of the feature point descriptor $f_i^n$ is stored in the entry storage location at the first column and second row, and the index information includes: (n, 001101011000). Because a Hash value of a descriptor segment 2 is 101, index information of the feature point descriptor $f_i^n$ is stored in the entry storage location at the second column and sixth row. Because a Hash value of a descriptor segment 3 is 011, index information of the feature point descriptor $f_i^n$ is stored in the entry storage location at the third column and fourth row. Because a Hash value of a descriptor segment 4 is 000, index information of the feature point descriptor $f_i^n$ is stored in the entry storage location at the fourth column and first row.

The foregoing is described by using an example in which the feature point descriptor is 12-bit information, m=4, and n=8. However, different values may be used in different embodiments. For example, in a case that the feature point descriptor is 256-bit information, $n=2^{(256/m)}$. In a case that m=16, n=65536.

Figure 9:
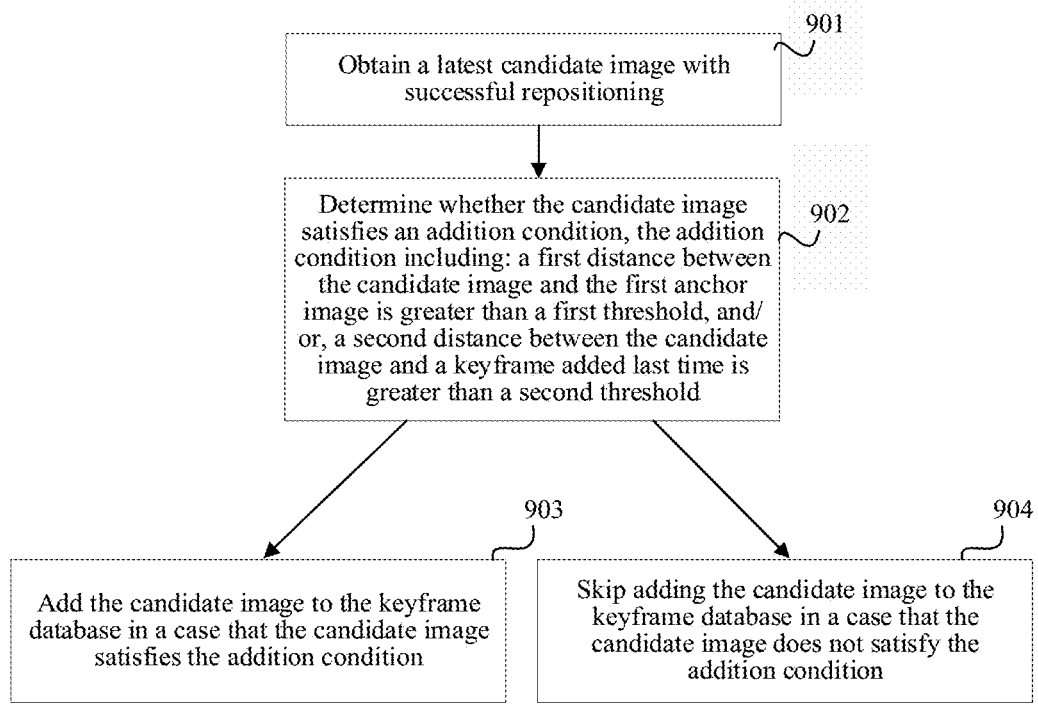
FIG. 9 is a flowchart of a keyframe addition process according to an exemplary embodiment of this application.

Keyframe Addition Stage:

In the optional embodiment based on FIG. 7, the device needs to add a keyframe to a keyframe database in a historical repositioning process. As shown in FIG. 9, the method further includes the following steps:

Step 901: Obtain a latest candidate image with successful repositioning.

In an initial state, the keyframe database may be empty, and the device only uses the first anchor image as an anchor image for repositioning. With the execution of an entire camera tracking process, there are an increasing large number of images with successful repositioning relative to the first anchor image (or a keyframe that has been added to the keyframe database).

Every time repositioning succeeds, the device uses the image with successful repositioning as a candidate image that may be added to the keyframe database. Optionally, the successful repositioning includes: successful repositioning relative to the first anchor image, or, successful repositioning relative to an existing keyframe in the keyframe database.

The device chooses some images from the candidate images as keyframes and adds the keyframes to the keyframe database.

The candidate images may be chosen in another manner. For example, provided that an image can successfully match the first anchor image, even if repositioning is not successfully performed on the image, the image may be used as a candidate image for expanding the keyframe database.

Step 902: Determine whether the candidate image satisfies an addition condition, the addition condition including: a first distance between the candidate image and the first anchor image is greater than a first threshold, and/or, a second distance between the candidate image and a keyframe added last time is greater than a second threshold.

Optionally, there needs to be a particular distance between a currently added keyframe and the first anchor image, because in a case that two images are relatively close, the repositioning effect of using the currently added keyframe is not significantly different from that of directly using the first anchor image.

The device calculates the first distance between the candidate image and the first anchor image. The first distance is used to represent an image similarity or a camera pose similarity between the candidate image and the first anchor image. In this application, a specific calculation manner of the first distance is not limited. In an optional embodiment, for an initial feature point in the first anchor image, a target feature point matching the initial feature point exists in the candidate image. One initial feature point and a corresponding target feature point constitute a matching feature point pair. An L2 distance (a Euclidean distance corresponding to the norm of L2) is calculated according to each matching feature point pair. An average value of all L2 distances is used as the first distance between the candidate image and the first anchor image. For example, the first threshold is 50 pixels. In a case that the first distance between the candidate image and the first anchor image is greater than 50 pixels, the candidate image is added to the keyframe database.

Optionally, there needs to be a particular distance between the currently added keyframe and the keyframe added last time, because in a case that two images are relatively close, the repositioning effect of using the currently added keyframe is not significantly different from that of using the keyframe added last time.

The device calculates the second distance between the candidate image and the keyframe added last time. The second distance is used to represent an image similarity or a camera pose similarity between the candidate image and the keyframe added last time. In this application, a specific calculation manner of the second distance is not limited. In an optional embodiment, a quantity of repositioning images between the candidate image and the keyframe added last time is used as the second distance. For example, the second threshold is 10. In a case that the quantity of repositioning images between the candidate image and the keyframe added last time exceeds 10, the candidate image is added to the keyframe database.

Step 903: Add the candidate image to the keyframe database in a case that the candidate image satisfies the addition condition.

In a case that it is determined that the candidate image satisfies the addition condition, the candidate image is added to the keyframe database as a keyframe. Optionally, first feature point descriptors of keyframes and a positioning result of the first repositioning are stored in the keyframe database. The first feature point descriptors may be stored in the Hash index information, and the positioning result of the first repositioning may be represented by a keyframe pose parameter of a camera during acquisition of a keyframe or may be represented by a pose change amount of a change of the camera from an initial pose parameter to the keyframe pose parameter. This embodiment is described by using an example in which the positioning result of the first repositioning is represented by a rotation matrix and a displacement vector.

Figure 10:
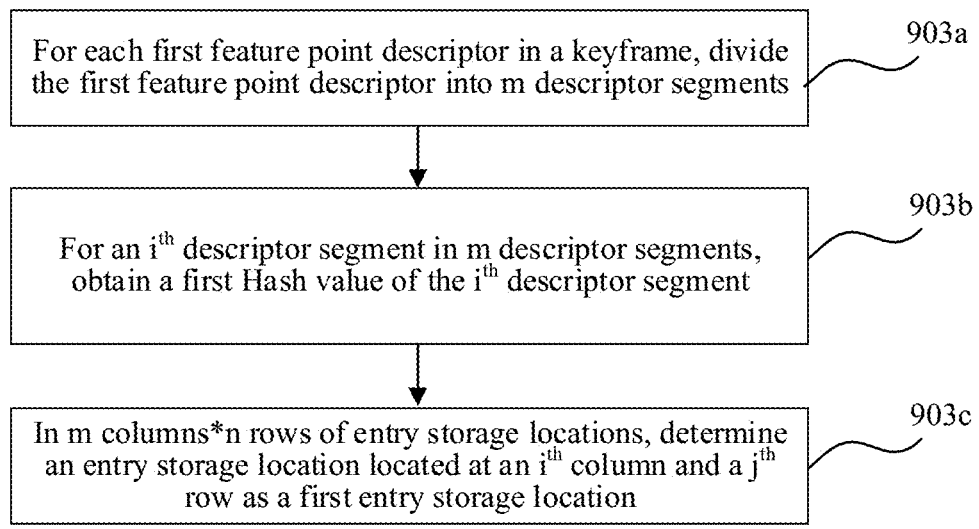
FIG. 10 is a flowchart of a Hash classification process according to an exemplary embodiment of this application.

Optionally, this step includes the following sub-steps, as shown in FIG. 10:

Step 903a: For each first feature point descriptor in a keyframe, divide the first feature point descriptor into m descriptor segments.

There may be a plurality of keyframes, for example, 1 to 1000 keyframes. There are a plurality of first feature points in each keyframe. The first feature point is represented by the first feature point descriptor. The first feature point descriptor is a 256-bit ORB feature point descriptor.

For each first feature point descriptor in each keyframe, the device divides the first feature point descriptor into m descriptor segments. Optionally, the device divides the first feature point descriptor according to an equal division principle into m descriptor segments, m being less than a total bit quantity of the first feature point descriptor, and m being a power of 2. Table 1 schematically shows the process.

TABLE 1

| Index information | First feature point descriptor | Descriptor segments obtained through division |
|---|---|---|
| Keyframe A, point A1 | 010000110101 | 010 000 110 101 |
| Keyframe A, point A2 | 001110101011 | 001 110 101 011 |
| Keyframe B, point B1 | 001110101010 | 001 110 101 010 |

Step 903b: For an $i^{th}$ descriptor segment in m descriptor segments, obtain a first Hash value of the $i^{th}$ descriptor segment.

For the $i^{th}$ descriptor segment, the $i^{th}$ descriptor segment is directly used as the first Hash value, or calculation of a preset Hash function is performed to obtain the first Hash value, where $0 \leq i \leq m-1$ or $1 \leq i \leq m$.

Step 903c: In m columns*n rows of entry storage locations, determine an entry storage location located at an $i^{th}$ column and a $i^{th}$ row as a first entry storage location.

For the $i^{th}$ descriptor segment, the device selects a $j^{th}$ row entry storage location corresponding to the first Hash value from entry storage locations in the $i^{th}$ column as the first entry storage location.

The entry storage location at the $i^{th}$ column and the $j^{th}$ row is an entry storage location matching the first Hash value in the n entry storage locations located in the $i^{th}$ column.

Table 2 schematically shows a process of storing three first feature point descriptors in the Hash index information. The (point B1, image B) represents index information of a first feature point descriptor B1 in a keyframe B.

Step 904: Skip adding the candidate image to the keyframe database in a case that the candidate image does not satisfy the addition condition.

The candidate image is not added to the keyframe database in a case that the first distance between the candidate image and the first anchor image is less than the first threshold, or, the second distance between the candidate image and the keyframe added last time is less than the second threshold.

In conclusion, by means of the repositioning method provided in this embodiment, an addition condition is used to select a candidate image, so as to select a representative keyframe, so that a keyframe in a keyframe database can cover as many as possible different areas in a real scene, thereby ensuring the success rate of performing second repositioning on a current image relative to a keyframe.

In the repositioning method provided in this embodiment, first feature point descriptors of keyframes are further stored in the Hash index information in a distributed manner, so that a quantity of first feature point descriptors that require matching in a keyframe search process can be reduced, it is not necessary to poll all the first feature point descriptors for matching, and it is highly probable that the most similar first feature point descriptor can be found through matching according to a Hash classification rule in a plurality of first feature point descriptors in the same entry storage location.

Keyframe Search Stage

Figure 11:
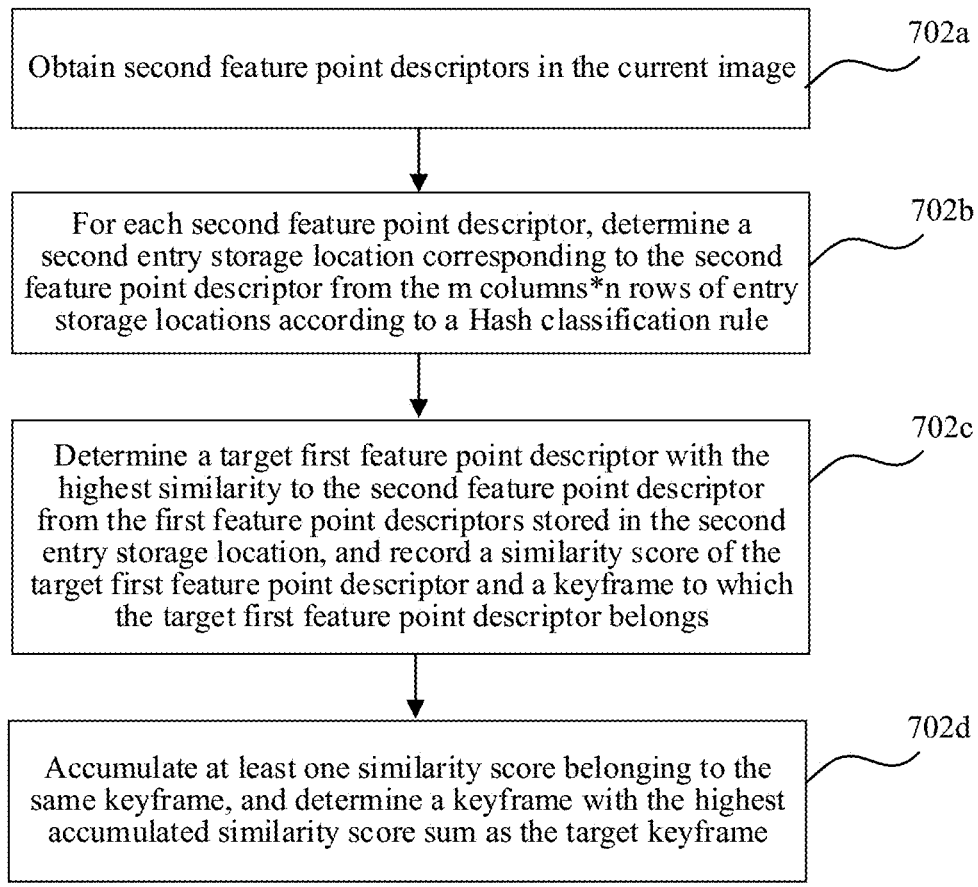
FIG. 11 is a flowchart of a keyframe search process according to an exemplary embodiment of this application.

In the optional embodiment based on FIG. 7, step 702 includes the following sub-steps, as shown in FIG. 11:

Step 702a: Obtain second feature point descriptors in the current image.

The device extracts second feature point descriptors from the current image. An extraction manner of a second feature point descriptor is the same as that of a first feature point descriptor. "The first" in the first feature point descriptor in this application is used to represent the feature point descriptor belongs to a keyframe, and "the second" in the second feature point descriptor is used to represent that the feature point descriptor belongs to the current image.

The device may use an ORB feature point descriptor extracted based on an ORB (fast feature point extraction and description) algorithm as the second feature point descriptor. Alternatively, another binary feature point descriptor may be used.

Step 702b: For each second feature point descriptor, determine a second entry storage location corresponding to

TABLE 2

| Hash Table 1 | Hash Table 2 | Hash Table 3 | Hash Table 4 |
|---|---|---|---|
| 000 | 000 | 000 | 000 |
|  | (point A1, image A) |  |  |
| 001 | 001 | 001 | 001 |
| (point B1, image B) |  |  |  |
| (point A2, image A) |  |  |  |
| 010 | 010 | 010 | 010 |
| (point A1, image A) |  |  | (point B1, image B) |
| 011 | 011 | 011 | 011 |
|  |  |  | (point A2, image A) |
| 100 | 100 | 100 | 100 |
| 101 | 101 | 101 | 101 |
|  |  | (point B1, image B) | (point A1, image A) |
|  |  | (point A2, image A) |  |
| 110 | 110 | 110 | 110 |
|  | (point B1, image B) | (point A1, image A) |  |
|  | (point A2, image A) |  |  |
| 111 | 111 | 111 | 111 | the second feature point descriptor from the m columns*n rows of entry storage locations according to the Hash classification rule.

This step may include the following sub-steps:

1: Divide the second feature point descriptor into m descriptor segments.

2. For an $i^{th}$ descriptor segment in m descriptor segments, obtain the second Hash value of the $i^{th}$ descriptor segment.

3. In the m columns*n rows of entry storage locations, determine an entry storage location located at an $i^{th}$ column and a $i^{th}$ row as the second entry storage location.

The entry storage location at the $i^{th}$ column and the $j^{th}$ row is an entry storage location matching the second Hash value in the n entry storage locations located in the $i^{th}$ column.

The second entry storage location and the first entry storage location are only different description manners and represent results of two Hash classification processes, but in practice may be the same entry storage location in the m columns*n rows of entry storage locations.

Step 702c: Determine a target first feature point descriptor with the highest similarity to the second feature point descriptor from the first feature point descriptors stored in the second entry storage location, and record a similarity score of the target first feature point descriptor and a keyframe to which the target first feature point descriptor belongs.

Optionally, the second entry storage location already stores a plurality of first feature point descriptors in a plurality of keyframes. These first feature point descriptors are feature point descriptors that are classified into the same class according to the Hash classification rule.

For the second feature point descriptor in the current image, a similarity degree between the second feature point descriptor and each first feature point descriptor in the second entry storage location may be calculated in a case that an $i^{th}$ descriptor segment of the second feature point descriptor is classified into the second entry storage location. Optionally, a ratio of a quantity of the same bits to a total quantity of bits is used to represent the similarity degree.

For example, it is assumed that the second feature point descriptor in the current image is 010110100001 and is divided into four descriptor segments 010, 110, 100, and 001. For a descriptor segment 1 of 001, it is determined that the entry storage location at the first column and the third row is the second entry storage location, similarity scores between the second feature point descriptor and the first feature point descriptors stored in the entry storage location at the first column and the third row are calculated, and the first feature point descriptor with the highest similarity score is determined as the target first feature point descriptor. A similarity score of the target first feature point descriptor and a keyframe to which the target first feature point descriptor belongs are recorded. Because the second feature point descriptor is divided into four descriptor segments, each second feature point descriptor correspondingly has four target first feature point descriptors. There may be a repetition in the four target first feature point descriptors.

The foregoing process is performed for k second feature point descriptors in the current image. At most k*m target first feature point descriptors, a similarity score corresponding to each target first feature point descriptor, and a keyframe to which each target first feature point descriptor belongs can be obtained.

Step 702d: Accumulate at least one similarity score belonging to the same keyframe, and determine a keyframe with the highest accumulated similarity score sum as the target keyframe.

For at most k*m target first feature point descriptors in the current image, because many target first feature point descriptors may belong to the same keyframe, similarity scores of target first feature point descriptors belonging to the same keyframe are accumulated, to obtain respective accumulated similarity score sums of a plurality of keyframes. The keyframe with the highest accumulated similarity score sum is determined as a target keyframe corresponding to the current image.

In conclusion, by means of the method provided in this embodiment, Hash index information can be used to rapidly find a target keyframe matching a current image from a keyframe database. Because first feature point descriptors of keyframes are stored in the Hash index information in a distributed manner, a quantity of first feature point descriptors that require matching during a search for the target keyframe matching the current image can be reduced, and it is not necessary to poll all the first feature point descriptors for matching, thereby accelerating the entire matching process.

In addition, because the Hash index information has a relatively small data amount and does not occupy an excessively large storage space, the method provided in this embodiment of this application is applicable to an AR application on a mobile terminal, thereby reducing the occupation of a limited storage space on the mobile terminal.

Keyframe Deletion Stage

Figure 12:
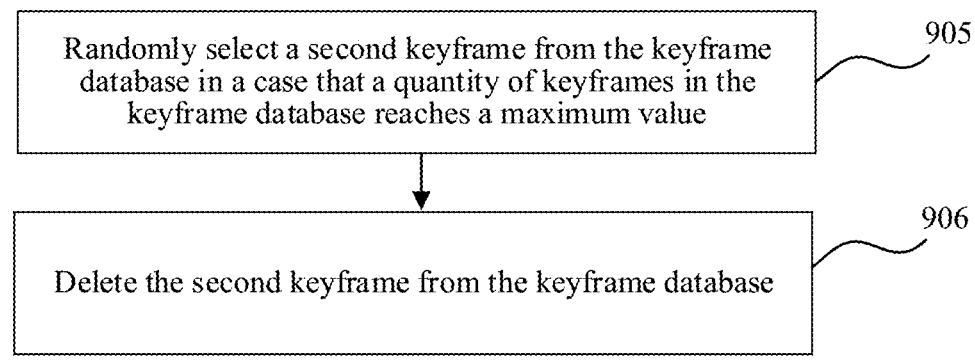
FIG. 12 is a flowchart of a keyframe deletion process according to an exemplary embodiment of this application.

Too many keyframes cause calculation amount load to a repositioning process, making it difficult to find a desired image, and therefore are not recommended in a keyframe database. In a schematic example, there are 1000 or fewer keyframes in the keyframe database. In the optional embodiment based on FIG. 7, the following steps may further be included, as shown in FIG. 12:

Step 905: Randomly select a second keyframe from the keyframe database in a case that a quantity of keyframes in the keyframe database reaches a maximum value.

Step 906: Delete the second keyframe from the keyframe database.

Optionally, this step includes the following sub-steps:

1: Obtain first feature point descriptors in the second keyframe.

2: For each first feature point descriptor, determine a first entry storage location corresponding to the first feature point descriptor from the m columns*n rows of entry storage locations according to the Hash classification rule.

3: Delete the first feature point descriptor and an identifier of the second keyframe from the first entry storage location.

That is, the index information of the first feature point descriptor is deleted from the first entry storage location.

By means of the method provided in this embodiment, in a case that a quantity of keyframes in a keyframe database reaches a maximum value (for example, 1000), a keyframe closest to a candidate images is further deleted, so that the keyframe database can adequately keep representative keyframes, thereby ensuring the efficiency of searching the keyframe database for a keyframe.

In the optional embodiment based on FIG. 7, the device preferentially performs third repositioning on a current image relative to the first anchor image in a case that the current image satisfies a repositioning condition; and attempts to perform repositioning on the current image relative to a keyframe in a keyframe database in a case that the third repositioning fails. That is, the device preferentially performs zeroth-order repositioning, and uses a result of the zeroth-order repositioning in a case that the zeroth-order repositioning succeeds, or performs first-order repositioning in a case that the zeroth-order repositioning does not succeed.

In another optional embodiment based on FIG. 7, the device performs two repositioning processes in parallel in a case that a current image satisfies a repositioning condition. In one aspect, the device performs second repositioning on the current image relative to a keyframe in the keyframe database. In another aspect, the device performs third repositioning on the current image relative to the first anchor image. That is, first-order repositioning and zeroth-order repositioning are independent and may be performed in parallel. A result of the successful repositioning is used in a case that the second repositioning or the third repositioning succeeds. In a case that both the second repositioning and the third repositioning succeed, a result of the zeroth-order repositioning is preferentially used.

In the optional embodiment based on FIG. 7, in a case that the foregoing method is applied to an AR system, direct use of a result of repositioning may cause a hopping. The device may input a calculated target pose parameter into a filter (a Kalman filter or a complementary filter) and use the target pose parameter as an observed value. A movement model is used to estimate a predictor, and the predictor is used as an actually used target pose parameter. That is, subsequent processing is performed under the premise of trusting the observed value at a high probability. Therefore, the AR system obtains a smooth result, and there is no hopping in a displayed user picture, thereby ensuring better user experience.

In a camera pose tracking process based on a plurality of anchor images, there is also often a process of performing feature point tracking on a current image relative to an $i^{th}$ anchor image. A fast indexing method of the foregoing Hash index information can further be used to accelerate a feature point matching process between two images. It is assumed there are a first image and a second image. The first image is the $i^{th}$ anchor image, and the second image is the current image to be matched. An embodiment of this application further provides the following feature point matching method.

Figure 13:
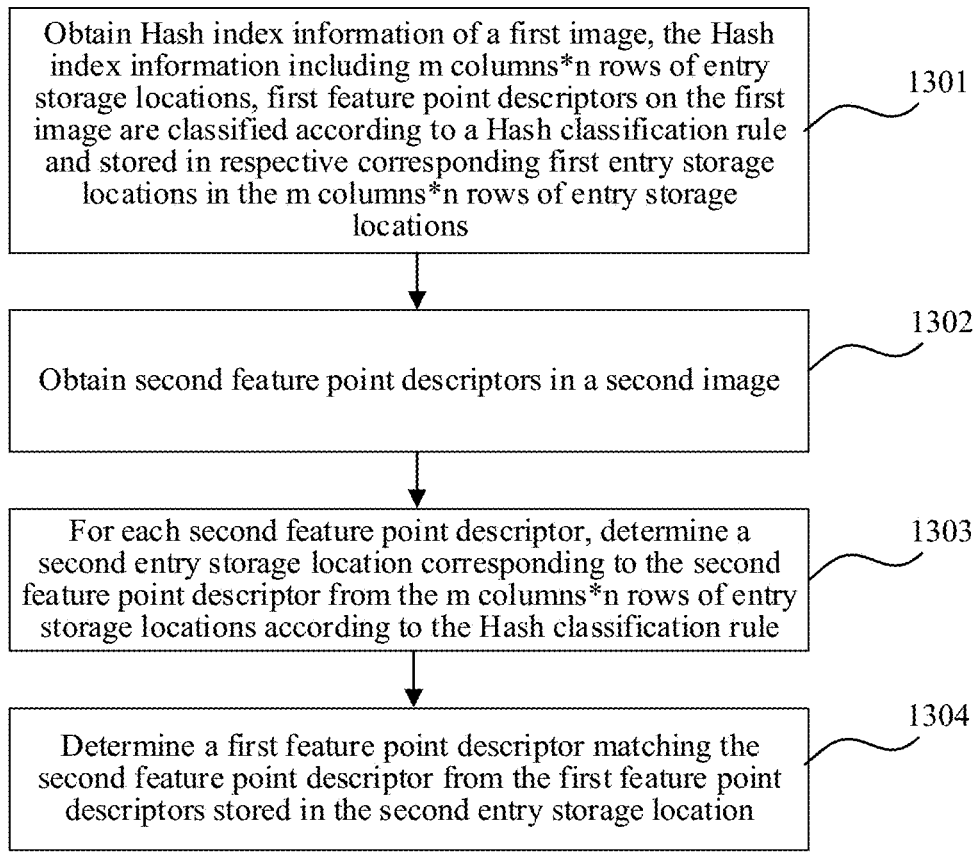
FIG. 13 is a flowchart of a feature point tracking method according to an exemplary embodiment of this application.

FIG. 13 is a flowchart of a feature point matching method according to an exemplary embodiment of this application. The method is applicable to the device shown in FIG. 4, for example, is applicable to a process of performing feature point matching on an $i^{th}$ anchor image or applicable to another computer device that performs image processing. The method includes the following steps:

Step 1301: Obtain Hash index information of a first image, the Hash index information including m columns*n rows of entry storage locations, first feature point descriptors on the first image are classified according to a Hash classification rule and stored in respective corresponding first entry storage locations in the m columns*n rows of entry storage locations.

Figure 14:
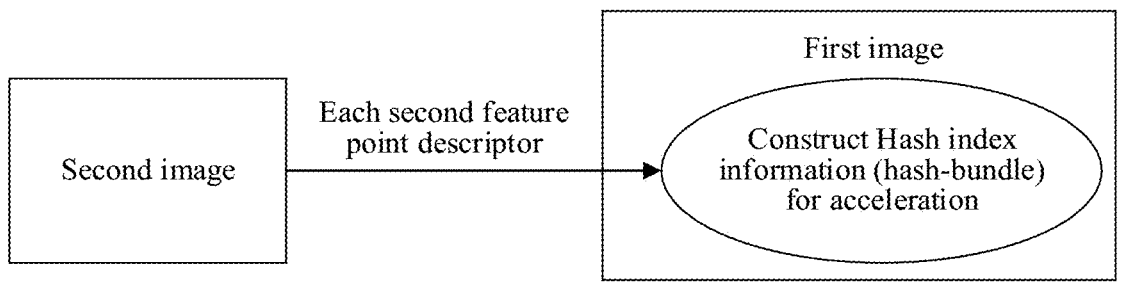
FIG. 14 is a schematic diagram of the principle of a feature point tracking method according to an exemplary embodiment of this application.

It is set that the first image is the $i^{th}$ anchor image, and first feature point descriptors in the first image are classified according to the Hash classification rule and stored in respective corresponding first entry storage locations in the m columns*n rows of entry storage locations in advance. A difference from the foregoing embodiments lies in that same Hash index information (a same hash-bundle) is established for a plurality of keyframes in the foregoing embodiments, and Hash index information is separately established for the first image in this embodiment. That is, in the Hash index information, only the Hash index information of the first image is stored, as shown in FIG. 14. In other words, in a case that the first image is an anchor image, each anchor image corresponds to respective Hash index information. For a process of storing the Hash index information of the first image, reference may be made to the description of the foregoing step 903 (FIG. 10). Details are not described herein again.

Step 1302: Obtain second feature point descriptors in the second image.

It is set that the second image is an image on which feature point tracking is to be performed, for example, a current image.

The device may use a SIFT feature point descriptor extracted based on a SIFT algorithm or an ORB feature point descriptor extracted based on an ORB (fast feature point extraction and description) algorithm as the second feature point descriptor.

Step 1303: For each second feature point descriptor, determine a second entry storage location corresponding to the second feature point descriptor from the m columns*n rows of entry storage locations according to the Hash classification rule.

This step may include the following sub-steps:

1: Divide the second feature point descriptor into m descriptor segments.

2: For an $i^{th}$ descriptor segment in m descriptor segments, obtain the second Hash value of the $i^{th}$ descriptor segment.

3. In the m columns*n rows of entry storage locations, determine an entry storage location located at an $i^{th}$ column and a $i^{th}$ row as the second entry storage location.

The entry storage location at the $i^{th}$ column and the $j^{th}$ row is an entry storage location matching the second Hash value in the n entry storage locations located in the $i^{th}$ column.

The second entry storage location and the first entry storage location are only different description manners and represent results of two Hash classification processes, but in practice may be the same entry storage location in the m columns*n rows of entry storage locations.

Step 1304: Determine a first feature point descriptor matching the second feature point descriptor from the first feature point descriptors stored in the second entry storage location.

Optionally, the second entry storage location already stores a plurality of first feature point descriptors in a plurality of keyframes. These first feature point descriptors are feature point descriptors that are classified into the same class according to the Hash classification rule.

For the second feature point descriptor in the current image, a similarity degree between the second feature point descriptor and each first feature point descriptor in the second entry storage location may be calculated in a case that an $i^{th}$ descriptor segment of the second feature point descriptor is classified into the second entry storage location. Optionally, a ratio of a quantity of the same bits to a total quantity of bits is used to represent the similarity degree. A first feature point descriptor with the highest similarity degree is determined as the first feature point descriptor matching the second feature point descriptor.

In conclusion, by means of the feature point matching method provided in this embodiment, Hash index information can be used to reduce a quantity of candidate first feature point descriptors against which the second feature point descriptor needs to be matched, so that it is not necessary to perform matching on all the first feature point descriptors in the first image, and it is only necessary to perform matching on first feature point descriptors in some entry storage locations, thereby accelerating a matching process.

Figure 15:
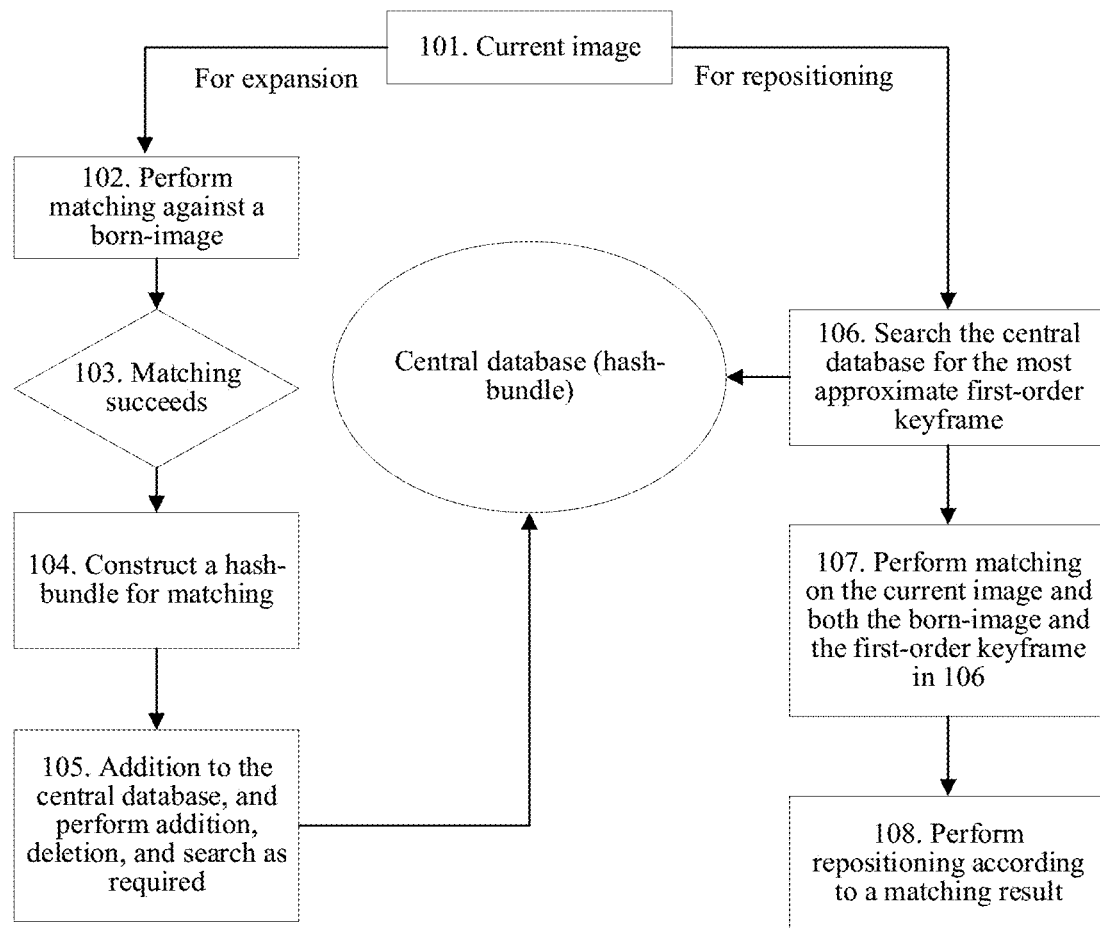
FIG. 15 is a flowchart of a repositioning method in a camera pose tracking process according to an exemplary embodiment of this application.

In a schematic example, as shown in FIG. 15: S101: A device obtains a current image acquired by a camera. S102: Perform matching on the current image and a born-image (that is, perform repositioning) in a case that the current image is a candidate image used to expand a keyframe database, to obtain a first repositioning result. S103: Use the current image as an image with successful first-order repositioning in a case that matching is successfully performed on the current image relative to the born-image. S104: Establish a hash-bundle, that is, Hash index information, for matching for an image with successful first-order repositioning. For related details, reference may be made to the embodiment shown in FIG. 13. S105: Add the image with successful first-order repositioning to a central database (a hash-bundle shared by all keyframes). Addition, deletion, and search are performed as required. For a detailed process, reference may be made to the foregoing keyframe addition, deletion, and search process. S106: Search the central database for the most approximate first-order keyframe in a case that the current image is an image used for repositioning. S107: Perform matching (that is, perform repositioning) on the current image and both the born-image and the most approximate first-order keyframe. S108: Perform repositioning according to a matching result, to obtain a second repositioning result.

In a schematic example, the foregoing repositioning method in a camera pose tracking process may be used in an AR program. By means of the repositioning method, a pose of the camera on a terminal can be tracked in real time according to scene information in the real world, and a display position of an AR element in an AR application is adjusted and changed according to a tracking result. An AR program run on the mobile phone in FIG. 1 or FIG. 2 is used as an example. In a case that a still cartoon character standing on a book needs to be displayed, no matter how a user moves the mobile phone, it is only necessary to change a display position of the cartoon character according to a pose change of the camera on the mobile phone, so that the standing position of the cartoon character on the book can be kept unchanged.

The following provides apparatus embodiments of this application. For details that are not specifically described in the apparatus embodiments, reference may be made to the foregoing method embodiments.

Figure 16:
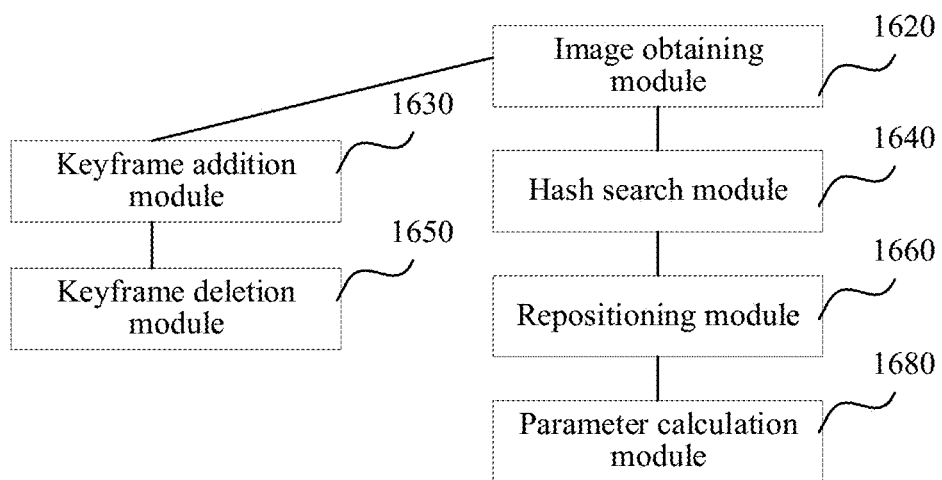
FIG. 16 is a block diagram of a repositioning apparatus in a camera pose tracking process according to an exemplary embodiment of this application.

FIG. 16 is a block diagram of a repositioning apparatus in a camera pose tracking process according to an exemplary embodiment of this application. The repositioning apparatus may be implemented by software, hardware or a combination of software and hardware as an entire electronic device (or referred to as a mobile terminal) or a part of the electronic device. The repositioning apparatus includes an image obtaining module 1620, a Hash search module 1640, a repositioning module 1660, and a parameter calculation module 1680.

The image obtaining module 1620 is configured to obtain a current image acquired after an $i^{th}$ anchor image in a plurality of anchor images, i being greater than 1.

The Hash search module 1640 is configured to select a target keyframe from a keyframe database according to Hash index information in a case that the current image satisfies a repositioning condition, the keyframe database storing Hash index information corresponding to at least one keyframe, and the keyframe being an image that is cached in a camera pose tracking process and has successful first repositioning relative to another image.

The repositioning module 1660 is configured to perform second repositioning on the current image relative to the target keyframe.

The parameter calculation module 1680 is configured to calculate a camera pose parameter of a camera during acquisition of the current image according to a positioning result of the first repositioning and a positioning result of the second repositioning.

In an optional embodiment, the Hash index information includes m columns*n rows of entry storage locations, and first feature point descriptors in the keyframe are classified according to a Hash classification rule and stored in first entry storage locations corresponding to the m columns*n rows of entry storage locations.

The Hash search module 1640 is configured to: obtain the second feature point descriptors in the current image; for each second feature point descriptor, determine a second entry storage location corresponding to the second feature point descriptor from the m columns*n rows of entry storage locations according to the Hash classification rule; determine a target first feature point descriptor with the highest similarity to the second feature point descriptor from the first feature point descriptors stored in the second entry storage location, and record a similarity score of the target first feature point descriptor and a keyframe to which the target first feature point descriptor belongs; and accumulate at least one similarity score belonging to the same keyframe, and determine a keyframe with the highest accumulated similarity score sum as the target keyframe.

In an optional embodiment, the Hash search module 1640 is configured to: divide the second feature point descriptor into m descriptor segments; obtain a second Hash value of the $i^{th}$ descriptor segment for an $i^{th}$ descriptor segment in the m descriptor segments; determine an entry storage location located at an $i^{th}$ column and a $j^{th}$ row from the m columns*n rows of entry storage locations as a second entry storage location, the entry storage location at the $i^{th}$ column and the $j^{th}$ row being an entry storage location matching the second Hash value in the n entry storage locations located in the $i^{th}$ column.

In an optional embodiment, the apparatus further includes a keyframe addition module 1630, where
the image obtaining module 1620 is further configured to obtain a latest candidate image with successful repositioning; and
the keyframe addition module 1630 is further configured to determine whether the candidate image satisfies an addition condition, the addition condition including: a first distance between the candidate image and the first anchor image is greater than a first threshold, and/or, a second distance between the candidate image and a keyframe added last time is greater than a second threshold; and add the candidate image as the first keyframe to the keyframe database in a case that the candidate image satisfies the addition condition.

In an optional embodiment, the keyframe addition module 1630 is configured to obtain first feature point descriptors in the first keyframe; for each first feature point descriptor, determine a first entry storage location corresponding to the first feature point descriptor from the m columns*n rows of entry storage locations according to the Hash classification rule; and store the first feature point descriptor and an identifier of the first keyframe in the first entry storage location.

In an optional embodiment, the keyframe addition module 1630 is configured to: divide the first feature point descriptor into m descriptor segments; for an $i^{th}$ descriptor segment in the m descriptor segments, obtain a first Hash value of the $i^{th}$ descriptor segment; and determine an entry storage location located at an $i^{th}$ column and a $j^{th}$ row from the m columns*n rows of entry storage locations as a first entry storage location, the entry storage location at the $i^{th}$ column and the $j^{th}$ row being an entry storage location matching the first Hash value in the n entry storage locations located in the $i^{th}$ column.

In an optional embodiment, the apparatus further includes:

a keyframe deletion module 1650, configured to: randomly select a second keyframe from the keyframe database in a case that a quantity of keyframes in the keyframe database reaches a maximum value; and delete the second keyframe from the keyframe database.

In an optional embodiment, the keyframe deletion module 1650 is configured to: obtain first feature point descriptors in the second keyframe; for each first feature point descriptor, determine a first entry storage location corresponding to the first feature point descriptor from the m columns*n rows of entry storage locations according to the Hash classification rule; and delete the first feature point descriptor and an identifier of the second keyframe from the first entry storage location.

In an optional embodiment, the repositioning module 1660 is configured to perform third repositioning on the current image relative to the first anchor image in a case that the current image satisfies the repositioning condition; and the Hash search module 1640 is configured to perform the step of selecting the target keyframe from the keyframe database according to the Hash index information in a case that the third repositioning fails.

In a case that the repositioning apparatus in a camera pose tracking process provided in the foregoing embodiments implements repositioning, only divisions of the foregoing functional modules are described by using an example. During actual application, the foregoing functions may be allocated to and completed by different functional modules according to requirements, that is, the internal structure of the device is divided into different functional modules, to complete all or some of the foregoing described functions. In addition, the repositioning apparatus provided in the foregoing embodiments belongs to the same concept as the embodiments of the repositioning method. For a specific implementation process of the repositioning apparatus, refer to the method embodiments for details. Details are not described herein again.

Figure 17:
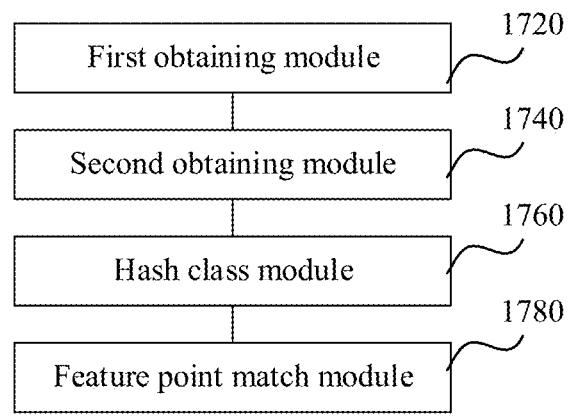
FIG. 17 is a block diagram of a feature point tracking apparatus according to an exemplary embodiment of this application.

FIG. 17 is a block diagram of a feature point matching apparatus according to an exemplary embodiment of this application. The feature point matching apparatus may be implemented by software, hardware or a combination of software and hardware as an entire electronic device (or referred to as a mobile terminal) or a part of the electronic device. The feature point matching apparatus includes a first obtaining module 1720, a second obtaining module 1740, a Hash class module 1760, and a feature point matching module 1780.

The first obtaining module 1720 is configured to obtain Hash index information of a first image, the Hash index information including m columns*n rows of entry storage locations, and first feature point descriptors in the first image being classified according to a Hash classification rule and stored in the respective corresponding first entry storage locations in the m columns*n rows of entry storage locations.

The second obtaining module 1740 is configured to obtain second feature point descriptors in the second image.

The Hash class module 1760 is configured to: for each second feature point descriptor, determine a second entry storage location corresponding to the second feature point descriptor from the m columns*n rows of entry storage locations according to the Hash classification rule.

The feature point matching module 1780 is configured to determine a first feature point descriptor matching the second feature point descriptor from the first feature point descriptors stored in the second entry storage location.

In an optional embodiment, the Hash class module 1760 is configured to: divide the second feature point descriptor into m descriptor segments; obtain a second Hash value of the $i^{th}$ descriptor segment for an $i^{th}$ descriptor segment in the m descriptor segments; and determine an entry storage location located at an $i^{th}$ column and a $j^{th}$ row from the m columns*n rows of entry storage locations as a second entry storage location, the entry storage location at the $i^{th}$ column and the $j^{th}$ row being an entry storage location matching the second Hash value in the n entry storage locations located in the $i^{th}$ column.

In a case that the feature point matching apparatus provided in the foregoing embodiments performs feature point matching on two frames of image, only divisions of the foregoing functional modules are described by using an example. During actual application, the foregoing functions may be allocated to and completed by different functional modules according to requirements, that is, the internal structure of the device is divided into different functional modules, to complete all or some of the foregoing described functions. In addition, the feature point matching apparatus provided in the foregoing embodiments belongs to the same concept as the embodiments of the feature point matching method. For a specific implementation process of the feature point matching apparatus, refer to the method embodiments for details. Details are not described herein again.

Figure 18:
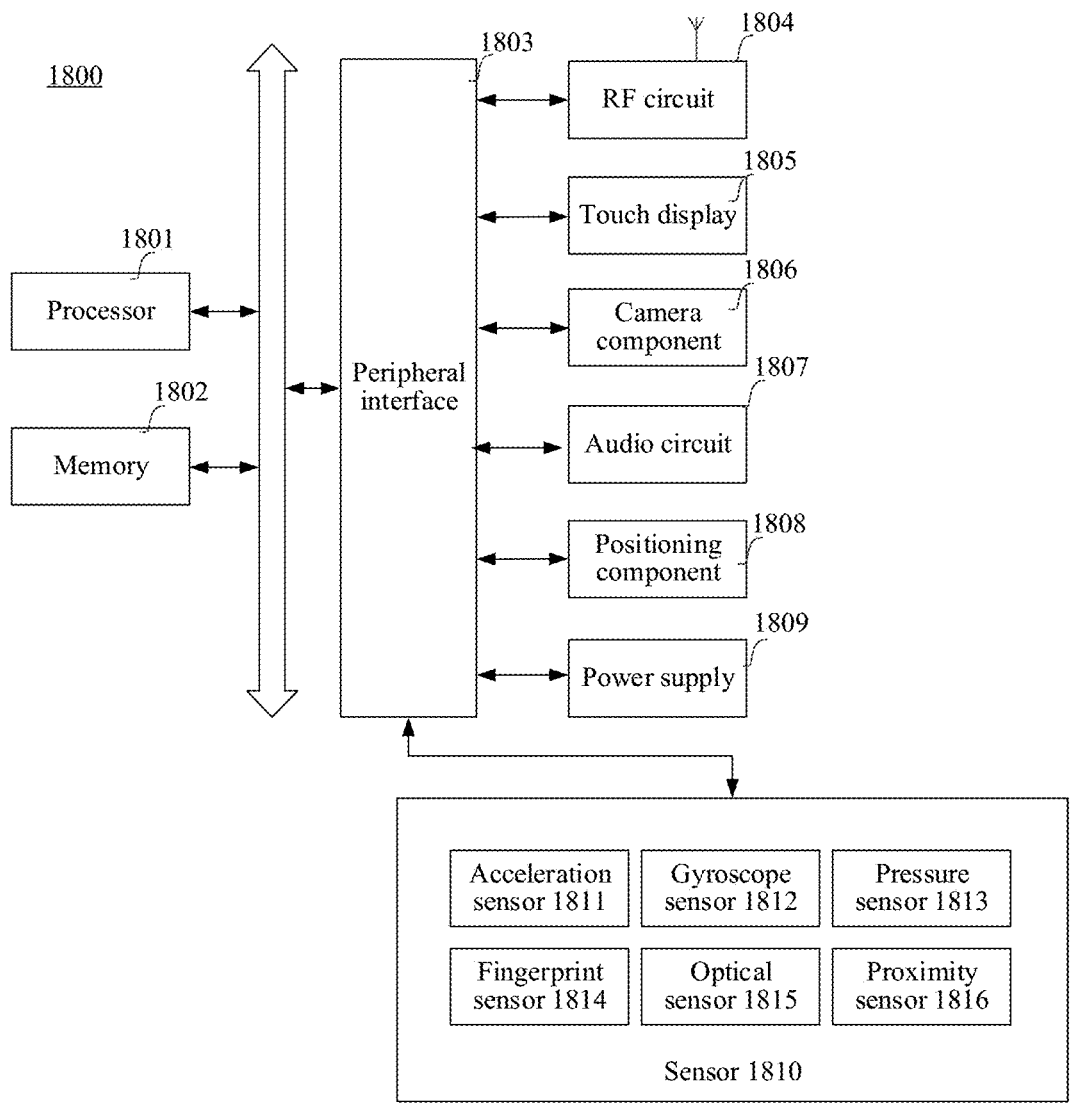
FIG. 18 is a block diagram of an electronic device according to an exemplary embodiment of this application.

FIG. 18 is a structural block diagram of an electronic device 1800 according to an exemplary embodiment of this application. The electronic device 1800 may be a smart phone, a tablet computer, a Moving Picture Experts Group Audio Layer III (MP3) player, a Moving Picture Experts Group Audio Layer IV (MP4) player, a laptop computer or a desktop computer. The terminal 1800 may also be referred to as a user device, a portable electronic device, a laptop electronic device, and a desktop electronic device, among other names.

Generally, the electronic device 1800 includes a processor 1801 and a memory 1802.

The processor 1801 may include one or more processing cores, for example, a 4-core processor, an 8-core processor, and the like. The processor 1801 may be implemented in at least one hardware form of a digital signal processor (DSP), a field-programmable gate array (FPGA), and a programmable logic array (PLA). The processor 1801 may also include a main processor and a co-processor. The main processor is a processor configured to process data in a wake-up state or is referred to as a central processing unit (CPU). The co-processor is a low power consumption processor configured to process data in a standby state. In some embodiments, the processor 1801 may be integrated with a graphics processing unit (GPU). The GPU is configured to render and draw content that needs to be displayed on a display. In some embodiments, the processor 1801 may further include an artificial intelligence (AI) processor. The AI processor is configured to process a computing operation related to machine learning.

The memory 1802 may include one or more computer-readable storage media. The computer-readable storage medium may be non-transient. The memory 1802 may further include a high-speed random access memory (RAM) and a non-volatile memory such as one or more magnetic disk storage devices or flash memory storage devices. In some embodiments, the non-transient computer-readable storage medium in the memory 1802 is configured to store at least one instruction. The at least one instruction is executed by the processor 1801 to implement the repositioning method in a camera pose tracking process provided in the method embodiments of this application.

In some embodiments, the electronic device 1800 further optionally includes a peripheral interface 1803 and at least one peripheral. The processor 1801, the memory 1802, and the peripheral interface 1803 may be connected by a bus or a signal line. Peripherals may be connected to the peripheral interface 1803 by a bus, a signal line or a circuit board. Schematically, the peripheral includes at least one of a radio frequency (RF) circuit 1804, a touch display 1805, a camera 1806, an audio circuit 1807, a positioning component 1808, and a power supply 1809.

The peripheral interface 1803 may be configured to connect at least one peripheral related to an input/output (I/O) to the processor 1801 and the memory 1802. In some embodiments, the processor 1801, the memory 1802, and the peripheral interface 1803 are integrated in one same chip or circuit board. In some other embodiments, any one or two of the processor 1801, the memory 1802, and the peripheral interface 1803 may be separately implemented on a chip or circuit board. This is not limited in this embodiment.

The RF circuit 1804 is configured to receive and transmit an RF signal, which is also referred to as electromagnetic signal. The RF circuit 1804 communicates with a communications network and another communication device by using an electromagnetic signal. The RF circuit 1804 converts an electrical signal into an electromagnetic signal for transmission, or, converts a received electromagnetic signal into an electrical signal. Optionally. The RF circuit 1804 includes an antenna system, an RF transceiver, one or more amplifiers, a tuner, an oscillator, a DSP, a CODEC chip set, a subscriber identity module card, and the like. The RF circuit 1804 may communicate with another electronic device by using at least one wireless communication protocol. The wireless communication protocol includes, but is not limited to, a World Wide Web, a metropolitan area network, an intranet, various generations of mobile communications networks (2G, 3G, 4G, and 5G), a wireless local area network and/or a Wireless Fidelity (Wi-Fi) network. In some embodiments. The RF circuit 1804 may further include a Near Field Communication (NFC)-related circuit. This is not limited in this application.

The display 1805 is configured to display a user interface (UI). The UI may include a graphic, a text, an icon, a video, and any combination thereof. In a case that the display 1805 is a touch display, the display 1805 further has a capability of acquiring a touch signal on or above the surface of the display 1805. The touch signal may be input as a control signal into the processor 1801 for processing. In this case, the display 1805 may further be configured to provide a virtual button and/or a virtual keyboard, which is also referred to as a soft button and/or a soft keyboard. In some embodiments, there may be one display 1805, disposed on a front panel of the electronic device 1800. In some other embodiments, there may be at least two displays 1805, respectively disposed on different surfaces of the electronic device 1800 or designed to be foldable. In some other embodiments, the display 1805 may be a flexible display, disposed on a curved surface or folded surface of the electronic device 1800. Even, the display 1805 may further be disposed to be a non-rectangular irregular graphic, that is, an irregular-shaped screen. The display 1805 may be manufactured by using a material such as a liquid crystal display (LCD) or an organic light-emitting diode (OLED).

The camera component 1806 is configured to acquire an image or a video. Optionally, the camera component 1806 includes a front-facing camera and a rear-facing camera. Generally, the front-facing camera is disposed on the front panel of the electronic device, and the rear-facing camera is disposed on the back surface of the electronic device. In some embodiments, there are at least two rear-facing cameras, which are respectively any one of a main camera, a depth-of-field camera, a wide-angle camera, a long-focus camera, to implement the integration of the main camera and the depth-of-field camera to implement a background blurring function, the integration of the main camera and the wide-angle camera to implement panoramic photography and a virtual reality (VR) photographing function or another integrated photographing function. In some embodiments, the camera component 1806 may further include a flash. The flash may be a mono color temperature flash or may be a dual color temperature flash. The dual color temperature flash is a combination of a warm light flash and a cold light flash and may be used for light compensation at different color temperatures.

The audio circuit 1807 may include a microphone and a loudspeaker. The microphone is configured to acquire sound waves from a user and an environment and convert the sound waves into electrical signals for input into the processor 1801 for processing or input into the RF circuit 1804 to implement voice communication. For stereo acquisition or noise reduction, there may be a plurality of microphones, respectively disposed at different positions of the electronic device 1800. The microphone may be alternatively a microphone array or an omnidirectional microphone. The loudspeaker is configured to convert an electrical signal from the processor 1801 or the RF circuit 1804 into a sound wave. The loudspeaker may be a conventional diaphragm loudspeaker or may be a piezoelectric ceramic loudspeaker. In a case that the loudspeaker is a piezoelectric ceramic loudspeaker, an electrical signal can be converted into a sound wave audible to humans, and an electrical signal can be converted into a sound wave inaudible to humans for uses such as ranging. In some embodiments, the audio circuit 1807 may further include an earphone jack.

The positioning component 1808 is configured to locate a current geographical position of the electronic device 1800, to implement navigation or a location-based service (LBS). The positioning component 1808 may be a positioning component based on the US' global positioning system (GPS), China's BeiDou system, Russia's GLONASS, and Europe's Galileo system.

The power supply 1809 is configured to supply power to various components in the electronic device 1800. The power supply 1809 may be alternating-current (AC) power, direct-current (AC) power, a disposable battery or a rechargeable battery. In a case that the power supply 1809 includes a rechargeable battery, the rechargeable battery may be a wired charging battery or a wireless charging battery. The wired charging battery is a battery charged by using a wired circuit, and the wireless charging battery is a battery charged by using a wireless coil. The rechargeable battery may be alternatively used to support a fast charging technology.

In some embodiments, the electronic device 1800 further includes one or more sensors 1810. The one or more sensors 1810 include, but are not limited to, an acceleration sensor 1811, a gyroscope sensor 1812, a pressure sensor 1818, a fingerprint sensor 1814, an optical sensor 1815, and a proximity sensor 1816.

The acceleration sensor 1811 may detect accelerations on three coordinate axes of a coordinate system established by the electronic device 1800. For example, the acceleration sensor 1811 may be configured to detect the components of the gravitational acceleration on the three coordinate axes. The processor 1801 may control the touch display 1805 according to a gravitational acceleration signal acquired by the acceleration sensor 1811 to display a user interface in a landscape view or a portrait view. The acceleration sensor 1811 may further be configured to acquire game data or movement data of a user.

The gyroscope sensor 1812 may detect a body direction and a rotational angle of the electronic device 1800, and the gyroscope sensor 1812 may coordinate with the acceleration sensor 1811 to acquire a 3D motion of a user on the electronic device 1800. The processor 1801 may implement the following functions according to data acquired by the gyroscope sensor 1812: motion sensing (for example, a UI is changed according to a tilt operation of a user), image stabilization during photographing, game control, and inertial navigation.

The pressure sensor 1818 may be disposed at a side frame of the electronic device 1800 and/or at an underlying layer of the touch display 1805. In a case that the pressure sensor 1818 is disposed at a side frame of the electronic device 1800, a holding signal of the electronic device 1800 by a user may be detected, and the processor 1801 performs left/right hand recognition or fast operation according to the holding signal acquired by the pressure sensor 1818. In a case that the pressure sensor 1818 is disposed at an underlying layer of the touch display 1805, and the processor 1801 controls an operable control on the UI according to a pressure operation on the touch display 1805 by the user. The operable control includes at least one of a button control, a scroll bar control, an icon control, and a menu control.

The fingerprint sensor 1814 is configured to acquire a fingerprint of a user, and the processor 1801 recognizes the identity of the user according to the fingerprint acquired by the fingerprint sensor 1814, or, the fingerprint sensor 1814 recognizes the identity of the user according to the acquired fingerprint. In a case that it is recognized that the identity of the user is a trusted identity, the processor 1801 authorizes the user to perform a related sensitive operation. The sensitive operation includes unlocking a screen, viewing encrypted information, downloading software, making a payment, changing a setting, and the like. The fingerprint sensor 1814 may be disposed on a front surface, a rear surface or a side surface of the electronic device 1800. In a case that the electronic device 1800 is provided with a physical button or a manufacturer logo, the fingerprint sensor 1814 may be integrated with the physical button or manufacturer logo.

The optical sensor 1815 is configured to acquire environmental light intensity. In an embodiment, the processor 1801 may control the display brightness of the touch display 1805 according to the environmental light intensity acquired by the optical sensor 1815. Schematically, the display brightness of the touch display 1805 is increased in a case that the environmental light intensity is relatively high. The display brightness of the touch display 1805 is reduced in a case that environmental light intensity is relatively low. In another embodiment, the processor 1801 may further dynamically adjust a photographing parameter of the camera component 1806 according to the environmental light intensity acquired by the optical sensor 1815.

The proximity sensor 1816 is also referred to as a distance sensor and is usually disposed on the front panel of the electronic device 1800. The proximity sensor 1816 is configured to acquire a distance between a user and the front surface of the electronic device 1800. In an embodiment, in a case that the proximity sensor 1816 detects that the distance between the user and the front surface of the electronic device 1800 gradually decreases, the processor 1801 controls the touch display 1805 to switch from a screen-on state to a screen-off state. In a case that the proximity sensor 1816 detects that the distance between the user and the front surface of the electronic device 1800 gradually increases, the processor 1801 controls the touch display 1805 to switch from the screen-off state to the screen-on state.

A person skilled in the art may understand that, the structure shown in FIG. 18 does not constitute a limitation to the electronic device 1800. More or fewer components than those shown in the figure may be included, or some component may be combined, or different component arrangements may be used.

The sequence numbers of the foregoing embodiments of this application are merely for description purpose and do not indicate the preference of the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory (ROM), a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A repositioning method in a camera pose tracking process, applied to an electronic device having a camera, the electronic device being applied to a process of sequentially performing camera pose tracking on a plurality of anchor images, the method comprising:
   obtaining a current image acquired by the camera after an ith anchor image in the plurality of anchor images, i being greater than 1;
   in accordance with a determination that the current image satisfies a repositioning condition, wherein the repositioning condition indicates that a tracking process of the current image relative to the ith anchor image fails:
      selecting a target keyframe from a keyframe database according to Hash index information, the keyframe database storing Hash index information corresponding to at least one keyframe, the target keyframe being an image that is cached in a camera pose tracking process and has a successful first repositioning relative to another image, wherein first feature point descriptors in the keyframe are classified according to a Hash classification rule and stored in first entry storage locations, and selecting a target keyframe from the keyframe database according to Hash index information includes:
         obtaining the second feature point descriptors in the current image;

for each second feature point descriptor, determining a second entry storage location corresponding to the second feature point descriptor; and determining a target first feature point descriptor with the highest similarity to the second feature point descriptor from the first feature point descriptors stored in the second entry storage location;

performing a second repositioning on the current image relative to the target keyframe; and calculating a camera pose parameter of the camera used by the camera during acquisition of the current image according to a positioning result of the first repositioning and a positioning result of the second repositioning, the positioning result of the first repositioning and the positioning result of the second repositioning indicate a movement amount of the camera in a real world, and the camera pose parameter includes a displacement vector and a rotation matrix.

2. The method according to claim 1, wherein the Hash index information comprising m columns*n rows of entry storage locations, and the first entry storage locations corresponds to the m columns*n rows of entry storage locations;

the selecting a target keyframe from a keyframe database according to Hash index information further comprises:

recording a similarity score of the target first feature point descriptor and a keyframe to which the target first feature point descriptor belongs; and accumulating at least one similarity score belonging to the same keyframe, and determining a keyframe with the highest accumulated similarity score sum as the target keyframe, wherein the second entry storage location is determined from the m columns*n rows of entry storage locations according to the Hash classification rule.

3. The method according to claim 2, wherein the determining a target entry storage location corresponding to the second feature point descriptor according to the Hash classification rule in the m columns*n rows of entry storage locations comprises:

dividing the second feature point descriptor into m descriptor segments;

obtaining a second Hash value of the ith descriptor segment for an ith descriptor segment in the m descriptor segments; and determining an entry storage location located at an ith column and a jth row from the m columns*n rows of entry storage locations as a second entry storage location, the entry storage location at the ith column and the jth row being an entry storage location matching the second Hash value in the n entry storage locations located in the ith column.

4. The method according to claim 1, further comprising:
obtaining a latest candidate image with successful repositioning;

determining whether the candidate image satisfies an addition condition, the addition condition comprising: a first distance between the candidate image and the first anchor image is greater than a first threshold, and/or, a second distance between the candidate image and a keyframe added last time is greater than a second threshold; and adding the candidate image as the first keyframe to the keyframe database in a case that the candidate image satisfies the addition condition, wherein the first distance represents an image similarity or a camera pose similarity between the candidate image and the first anchor image and the second distance represents an image similarity or a camera pose similarity between the candidate image and the keyframe added last time.

5. The method according to claim 4, wherein the adding the candidate image as the first keyframe to the keyframe database comprises:

obtaining first feature point descriptors in the first keyframe;

for each first feature point descriptor, determining a first entry storage location corresponding to the first feature point descriptor from the m columns*n rows of entry storage locations according to the Hash classification rule; and storing the first feature point descriptor and an identifier of the first keyframe in the first entry storage location.

6. The method according to claim 5, wherein the determining a first entry storage location corresponding to the first feature point descriptor from the m columns*n rows of entry storage locations according to the Hash classification rule comprises:

dividing the first feature point descriptor into m descriptor segments;

for an ith descriptor segment in the m descriptor segments, obtaining a first Hash value of the ith descriptor segment; and determining an entry storage location located at an ith column and a jth row from the m columns*n rows of entry storage locations as a first entry storage location, the entry storage location at the ith column and the jth row being an entry storage location matching the first Hash value in the n entry storage locations located in the ith column.

7. The method according to claim 4, further comprising:
randomly selecting a second keyframe from the keyframe database in a case that a quantity of keyframes in the keyframe database reaches a maximum value; and deleting the second keyframe from the keyframe database.

8. The method according to claim 7, wherein the deleting the keyframe to be deleted from the keyframe database comprises:

obtaining first feature point descriptors in the second keyframe;

for each first feature point descriptor, determining a first entry storage location corresponding to the first feature point descriptor from the m columns*n rows of entry storage locations according to the Hash classification rule; and deleting the first feature point descriptor and an identifier of the second keyframe from the first entry storage location.

9. The method according to claim 1, wherein the selecting a target keyframe from a keyframe database according to Hash index information in a case that the current image satisfies a repositioning condition comprises:

performing third repositioning on the current image relative to the first anchor image in a case that the current image satisfies the repositioning condition; and performing the operation of selecting the target keyframe from the keyframe database according to the Hash index information in a case that the third repositioning fails.

10. An electronic device, comprising a memory and a processor, a camera, and a plurality of programs stored in the memory, wherein the plurality of programs, when executed by the processor, cause the electronic device to sequentially perform a process of camera pose tracking on a plurality of anchor images, the process including:
  obtaining a current image acquired by the camera after an ith anchor image in the plurality of anchor images, i being greater than 1;
  in accordance with a determination that the current image satisfies a repositioning condition, wherein the repositioning condition indicates that a tracking process of the current image relative to the ith anchor image fails:
    selecting a target keyframe from a keyframe database according to Hash index information, the keyframe database storing Hash index information corresponding to at least one keyframe, the target keyframe being an image that is cached in a camera pose tracking process and has a successful first repositioning relative to another image, wherein first feature point descriptors in the keyframe are classified according to a Hash classification rule and stored in first entry storage locations, and selecting a target keyframe from the keyframe database according to Hash index information includes:
      obtaining the second feature point descriptors in the current image;
      for each second feature point descriptor, determining a second entry storage location corresponding to the second feature point descriptor; and
      determining a target first feature point descriptor with the highest similarity to the second feature point descriptor from the first feature point descriptors stored in the second entry storage location;
    performing a second repositioning on the current image relative to the target keyframe; and
    calculating a camera pose parameter of the camera used by the camera during acquisition of the current image according to a positioning result of the first repositioning and a positioning result of the second repositioning, the positioning result of the first repositioning and the positioning result of the second repositioning indicate a movement amount of the camera in a real world, and the camera pose parameter includes a displacement vector and a rotation matrix.

11. The electronic device according to claim 10, wherein the Hash index information comprising m columns*n rows of entry storage locations, and the first entry storage locations corresponds to the m columns*n rows of entry storage locations;
  the selecting a target keyframe from a keyframe database according to Hash index information further comprises:
  recording a similarity score of the target first feature point descriptor and a keyframe to which the target first feature point descriptor belongs; and
  accumulating at least one similarity score belonging to the same keyframe, and determining a keyframe with the highest accumulated similarity score sum as the target keyframe, wherein the second entry storage location is determined from the m columns*n rows of entry storage locations according to the Hash classification rule.

12. The electronic device according to claim 11, wherein the determining a target entry storage location corresponding to the second feature point descriptor according to the Hash classification rule in the m columns*n rows of entry storage locations comprises:
  dividing the second feature point descriptor into m descriptor segments;
  obtaining a second Hash value of the ith descriptor segment for an ith descriptor segment in the m descriptor segments; and
  determining an entry storage location located at an ith column and a jth row from the m columns*n rows of entry storage locations as a second entry storage location,
  the entry storage location at the ith column and the jth row being an entry storage location matching the second Hash value in the n entry storage locations located in the ith column.

13. The electronic device according to claim 10, wherein the process further comprises:
  obtaining a latest candidate image with successful repositioning;
  determining whether the candidate image satisfies an addition condition, the addition condition comprising: a first distance between the candidate image and the first anchor image is greater than a first threshold, and/or, a second distance between the candidate image and a keyframe added last time is greater than a second threshold; and
  adding the candidate image as the first keyframe to the keyframe database in a case that the candidate image satisfies the addition condition, wherein the first distance represents an image similarity or a camera pose similarity between the candidate image and the first anchor image and the second distance represents an image similarity or a camera pose similarity between the candidate image and the keyframe added last time.

14. The electronic device according to claim 13, wherein the adding the candidate image as the first keyframe to the keyframe database comprises:
  obtaining first feature point descriptors in the first keyframe;
  for each first feature point descriptor, determining a first entry storage location corresponding to the first feature point descriptor from the m columns*n rows of entry storage locations according to the Hash classification rule; and
  storing the first feature point descriptor and an identifier of the first keyframe in the first entry storage location.

15. The electronic device according to claim 14, wherein the determining a first entry storage location corresponding to the first feature point descriptor from the m columns*n rows of entry storage locations according to the Hash classification rule comprises:
  dividing the first feature point descriptor into m descriptor segments;
  for an ith descriptor segment in the m descriptor segments, obtaining a first Hash value of the ith descriptor segment; and
  determining an entry storage location located at an ith column and a jth row from the m columns*n rows of entry storage locations as a first entry storage location,
  the entry storage location at the ith column and the jth row being an entry storage location matching the first Hash value in the n entry storage locations located in the ith column.

16. The electronic device according to claim 13, wherein the process further comprises:
  randomly selecting a second keyframe from the keyframe database in a case that a quantity of keyframes in the keyframe database reaches a maximum value; and
  deleting the second keyframe from the keyframe database.

17. The electronic device according to claim 16, wherein the deleting the keyframe to be deleted from the keyframe database comprises:

obtaining first feature point descriptors in the second keyframe;

for each first feature point descriptor, determining a first entry storage location corresponding to the first feature point descriptor from the m columns*n rows of entry storage locations according to the Hash classification rule; and deleting the first feature point descriptor and an identifier of the second keyframe from the first entry storage location.

18. The electronic device according to claim 10, wherein the selecting a target keyframe from a keyframe database according to Hash index information in a case that the current image satisfies a repositioning condition comprises:

performing third repositioning on the current image relative to the first anchor image in a case that the current image satisfies the repositioning condition; and performing the operation of selecting the target keyframe from the keyframe database according to the Hash index information in a case that the third repositioning fails.

19. A non-transitory computer-readable storage medium storing instructions, the instructions, when executed by a processor of an electronic device having a camera, cause the electronic device to sequentially perform a process of camera pose tracking on a plurality of anchor images, the process including:

obtaining a current image acquired by the camera after an ith anchor image in the plurality of anchor images, i being greater than 1;

in accordance with a determination that the current image satisfies a repositioning condition, wherein the repositioning condition indicates that a tracking process of the current image relative to the ith anchor image fails:

selecting a target keyframe from a keyframe database according to Hash index information, the keyframe database storing Hash index information corresponding to at least one keyframe, the target keyframe being an image that is cached in a camera pose tracking process and has a successful first repositioning relative to another image, wherein first feature point descriptors in the keyframe are classified according to a Hash classification rule and stored in first entry storage locations, and selecting a target keyframe from the keyframe database according to Hash index information includes:

obtaining the second feature point descriptors in the current image;

for each second feature point descriptor, determining a second entry storage location corresponding to the second feature point descriptor; and determining a target first feature point descriptor with the highest similarity to the second feature point descriptor from the first feature point descriptors stored in the second entry storage location;

performing a second repositioning on the current image relative to the target keyframe; and calculating a camera pose parameter of the camera used by the camera during acquisition of the current image according to a positioning result of the first repositioning and a positioning result of the second repositioning, the positioning result of the first repositioning and the positioning result of the second repositioning indicate a movement amount of the camera in a real world, and the camera pose parameter includes a displacement vector and a rotation matrix.

20. The non-transitory computer-readable storage medium according to claim 19, wherein the Hash index information comprising m columns*n rows of entry storage locations, and the first entry storage locations corresponds to the m columns*n rows of entry storage locations;

the selecting a target keyframe from a keyframe database according to Hash index information further comprises:

recording a similarity score of the target first feature point descriptor and a keyframe to which the target first feature point descriptor belongs; and accumulating at least one similarity score belonging to the same keyframe, and determining a keyframe with the highest accumulated similarity score sum as the target keyframe, wherein the second entry storage location is determined from the m columns*n rows of entry storage locations according to the Hash classification rule.

* * * * *